(12) United States Patent
Portisch et al.

(10) Patent No.: US 12,229,171 B2
(45) Date of Patent: Feb. 18, 2025

(54) INTELLIGENT ANNOTATION OF ENTITY-RELATIONSHIP DATA MODELS

(71) Applicant: SAP SE, Walldorf (DE)

(72) Inventors: Jan Portisch, Bruchsal (DE); Stephan Schub, Oftersheim (DE)

(73) Assignee: SAP SE, Walldorf (DE)

( * ) Notice: Subject to any disclaimer, the term of this patent is extended or adjusted under 35 U.S.C. 154(b) by 356 days.

(21) Appl. No.: 17/180,498

(22) Filed: Feb. 19, 2021

(65) Prior Publication Data
US 2022/0269702 A1 Aug. 25, 2022

(51) Int. Cl.
G06F 16/28 (2019.01)
G06F 16/21 (2019.01)
G06F 16/22 (2019.01)
G06F 16/2457 (2019.01)

(52) U.S. Cl.
CPC .......... *G06F 16/288* (2019.01); *G06F 16/212* (2019.01); *G06F 16/2264* (2019.01); *G06F 16/24573* (2019.01)

(58) Field of Classification Search
CPC ............ G06F 16/288; G06F 16/212; G06F 16/2264; G06F 16/24573
See application file for complete search history.

(56) References Cited

U.S. PATENT DOCUMENTS

| | | | | |
|---|---|---|---|---|
| 6,052,687 A * | 4/2000 | Miura | ...................... | G06F 16/94 |
| 6,061,690 A * | 5/2000 | Nori | ...................... | G06F 16/221 |
| | | | | 707/999.005 |
| 8,260,824 B2 * | 9/2012 | Mao | ...................... | G06F 16/288 |
| | | | | 707/756 |
| 2006/0195460 A1* | 8/2006 | Nori | ...................... | G06F 16/252 |
| 2006/0293935 A1* | 12/2006 | Tsyganskiy | ............... | G06F 8/34 |
| | | | | 714/48 |
| 2007/0028221 A1* | 2/2007 | Ukelson | ................ | G06F 16/258 |
| | | | | 717/136 |
| 2007/0038651 A1* | 2/2007 | Bernstein | ................ | G06F 16/28 |
| 2007/0271251 A1* | 11/2007 | Levine | ................. | G06Q 10/107 |
| 2008/0301168 A1* | 12/2008 | Adler | ...................... | G06F 16/86 |
| | | | | 707/999.102 |
| 2010/0010960 A1* | 1/2010 | Singh | .................. | G06F 16/2456 |
| | | | | 707/E17.005 |

(Continued)

OTHER PUBLICATIONS

"API Testing," OpenAPI Testing Tool, Swagger Inspector, https://swagger.io/solutions/api-testing/, printed Feb. 3, 2021, 4 pages.

(Continued)

*Primary Examiner* — Pierre M Vital
*Assistant Examiner* — Zuheir A Mheir
(74) *Attorney, Agent, or Firm* — Klarquist Sparkman, LLP

(57) ABSTRACT

Intelligent annotation of data models can be implemented. In one embodiment, the method can receive a data model including entities and relationships between the entities. An entity can include a set of attributes. The method can annotate the data model by defining a logical entity including one or more of the entities, validate the logical entity, and automatically generate a message structure corresponding to the logical entity. The message structure can include properties mapped to at least some of the attributes of entities contained in the logical entity. The properties can be defined in one or more database tables represented by the logical entity.

16 Claims, 22 Drawing Sheets

(56) References Cited

U.S. PATENT DOCUMENTS

| | | | | |
|---|---|---|---|---|
| 2010/0217759 | A1* | 8/2010 | Ma | G06F 16/2282 707/719 |
| 2010/0250550 | A1* | 9/2010 | Tereposky | G06F 16/284 707/741 |
| 2010/0287208 | A1* | 11/2010 | Mao | G06F 16/288 707/804 |
| 2010/0318943 | A1* | 12/2010 | Gong | G06F 16/248 715/854 |
| 2013/0124466 | A1* | 5/2013 | Naidu | G06F 16/27 707/610 |
| 2018/0068001 | A1* | 3/2018 | Panwar | G06F 16/288 |
| 2020/0012741 | A1 | 1/2020 | Bracholdt et al. | |
| 2021/0149998 | A1* | 5/2021 | Sturgeon | G06F 30/00 |
| 2021/0240675 | A1* | 8/2021 | Portisch | G06F 16/2282 |
| 2022/0222253 | A1* | 7/2022 | Jouhier | G06F 8/51 |

OTHER PUBLICATIONS

Baeldung, "Intro to the Jackson ObjectMapper," https://www.baeldung.com/jackson-object-mapper-tutorial, printed Jan. 20, 2021, 10 pages.

"Cardinality (data modeling)," Wikipedia, https://en.wikipedia.org/wiki/Cardinality_(data_modeling), printed Nov. 13, 2020, 3 pages.

"Directed acyclic graph," Wikipedia, https://en.wikipedia.org/wiki/Directed_acyclic_graph, printed Jan. 25, 2021, 13 pages.

"Entity Relationship Diagram (ERD)—What is an ER Diagram," https://www.smartdraw.com/entity-relationship-diagram/, printed Jan. 25, 2021, 12 pages.

"Entity-relationship model," Wikipedia, https://en.wikipedia.org/wiki/Entity-relationship_model, printed Jan. 28, 2021, 11 pages.

Martin Fowler, "Command Query Responsibility Segregation," https://martinfowler.com/bliki/CQRS.html, Jul. 14, 2011, 6 pages.

Martin Fowler, "Event Sourcing," https://martinfowler.com/eaaDev/EventSourcing.html, Dec. 12, 2005, 21 pages.

Jonathan Freeman, "What is JSON? A better format for data exchange," InfoWorld, Oct. 25, 2019, 8 pages.

"JPA Object Relational Mapping," https://www.javatpoint.com/jpa-object-relational-mapping, printed Jan. 22, 2021, 4 pages.

"Object-relational Mapping," Wikipedia, https://en.wikipedia.org/wiki/object-relational_mapping, printed Nov. 13, 2020, 4 pages.

"Post (HTTP)," Wikipedia, https://en.wikipedia.org/wiki/POST_(HTTP), printed Feb. 3, 2021, 4 pages.

Anne Marie Smith, Aligning Data Governance and Enterprise Data Modeling, EWSolutions, Data Management University, Jul. 30, 2020, 6 pages.

"Swagger (software)," Wikipedia, https://en.wikipedia.org/wiki/Swagger_(software), printed Jan. 25, 2021, 3 pages.

"What is a Database Model," https://www.lucidchart.com/pages/database-diagram/database-models#section_6, printed Jan. 28, 2021, 15 pages.

"What is Entity Relationship Diagram (ERD)?" Visual Paradigm, https://www.visual-paradigm.com/guide/data-modeling/what-is-entity-relationship-diagram/ printed Feb. 5, 2021, 17 pages.

* cited by examiner

```
SELECT TOP 1000
   "FINANCIALCONTRACTID",
   "IDSYSTEM",
   "BusinessValidFrom",
   "BusinessValidTo",
   "SystemValidFrom",
   "DESCRIPTION",
   "LIFECYCLESTATUS",
   "APPLICABLELAW",
   "FINANCIALCONTRACTTYPE",
   "GOVERNINGLAWCOUNTRY",
   "GRACEPERIOD",
   "INTENDEDASSETLIABILITY",
   "LIFECYCLESTATUSCHANGEDATE",
   "LIFECYCLESTATUSREASON",
   "OFFERVALIDITYENDDATE",
   "OFFERVALIDITYSTARTDATE",
   "ORIGINALSIGNINGDATE",
   "PLACEOFJURISDICTION",
   "POCIACQUISITIONSTATUS",
   "PURPOSE",
   "PURPOSETPE",
```

Result x   Message x

Rows (1)

| | FINANCIALCONTRACT | IDSYSTEM | BusinessValidFrom | BusinessValidTo | SystemValidFrom | DESCRIPTION | LIFECYCLESTATUS | APPLICABLELAW | FINANCIALCONTRACTTYPE |
|---|---|---|---|---|---|---|---|---|---|
| 1 | My Contract 1 | 1 | 2020-01-01 | 2020-12-3 | 2020-01-01 00:00:00 | My example K | ActiveContract | NULL | NULL |

FIG. 12

```
Analyze

SELECT TOP 1000
  "ROLE",
  "ASSOC_FinancialContract.FINANCIALCONTRACTID",
  "ASSOC_FinancialContract.IDSYSTEM",
  "ASSOC_PartnerInParticipation.BUSINESSPARTNERID",
  "BusinessValidFrom",
  "BusinessValidTo",
  "SystemValidFrom",
  "BUSINESSPARTNERMAKINGTHEOFFER",
  "CONTRACTDATAOWNER",
  "MAINCOUNTERPARTY"
FROM "671EDB03751442C6881040F18B1DB3C3"."sap.fsdm::BUSINESSPARTNERCONTRACTASSIGNMENT"
```

↳ 1320

| Result x | Message x | | | |
|---|---|---|---|---|
| Rows (2) | | | | |
| | ROLE | ASSOC_FinancialContract.FINANCIALCONTRACTID | ASSOC_FinancialContract.IDSYSTEM | ASSOC_PartnerInParticipation.BUSINESSPARTNERID |
| 1 | CounterParty | My Contract 1 | 1 | MyCounterParty |
| 2 | SalesAgent | My Contract 1 | 1 | MySalesAgent |

```
message-structure > {} example_message.json > ...
{
  "FINANCIALCONTRACTID": "My Contract 1",
  "IDSYSTEM: "1",
  "BusinessValidFrom": "2020-01-01",
  "BusinessValidTo": "2020-12-31",
  "SystemValidFrom": "2020-01-01",
  "DESCRIPTION": "My example K",
  "LIFECYCLESTATUS": "ActiveContract",
  "APPLICABLELAW": null,
  "FINANCIALCONTRACTTYPE": null,
  "GOVERNINGLAWCOUNTRY": null,
  "GRACEPERIOD": null,
  "INTENDEDASSETLIABILITY": null,
  "LIFECYCLESTATUSCHANGEDATE": null,
  "LIFECYCLESTATUSREASON": null,
  "OFFERVALIDITYENDDATE": null,
  "OFFERVALIDITYSTARTDATE": null,
  "ORIGINALSIGNINGDATE": null,                    ← 1410
  "PLACEOFJURISDICTION": null,
  "POCIACQUISITIONSTATUS": null,
  "PURPOSE": null,
  "PURPOSETYPE": null,
  "SourceSystemID": null,
  "ChangeTimestampInSourceSystem": null,
  "ChangingUserInSourceSystem": null,
  "ChangingProcessType": null,
  "ChangingProcessID": null,              ← 1420
  "BusinesPartnerContractAssignment": [
      {
        "ROLE": "CounterParty",
        "ASSOC_PartnerInParticipation.BUSINESSPARTNERID": "MyCounterParty",
        "BUSINESSPARTNERMAKINGTHEOFFER": false,
        "CONTRACTDATAOWNER": false,
        "MAINCOUNTERPARTY": true                   1422
      },
      {
        "ROLE": "SalesAgent",
        "ASSOC_PartnerInParticipation.BUSINESSPARTNERID": "MySalesAgent",
        "BUSINESSPARTNERMAKINGTHEOFFER": true,
        "CONTRACTDATAOWNER": false,
        "MAINCOUNTERPARTY": false
      }                                            1424
  ]
}

```
swagger: "2.0"
info:
  description: "This is a sample API document that will be  automatically generated by
  the disclosed technology."
  version: "1.0"
  title: "Financial Contract Read API"
  contact:
    email: "firstname.lastname@sap.com"
host: "sap.com"
basePath: /
paths:
  /queryFinancialContract:
    post:
      summary: Get a financial contract given a template.
      consumes:
        - application/json
      parameters:
        - in: body
          name: FC template
          description: A sample template
          required: true
          schema:
            type: object
            description: "Represents a set of legally binding agreements, or intended
            agreements, between at least two business partners about one economic
            arrangement, such as a loan agreement between a lender and a borrower.
            Exception: Agreements that happen on an exchange or that reference a
            standardized specification issued by an exchange.  A trade for a security on the
            spot market is not a financial contract but a business event.  Scope: Agreements
            that add specifications of relatively minor importance to another agreement are
            considered part of the same financial contract. The concept of a financial
            contract also comprises information that is required to process the contract but
            that is not agreed explicitly."
            properties:
              FINANCIALCONTRACTID:
                type: string
                description: ""
                example: ""
              IDSYSTEM:
                type: string
                example: "SAP_FSDM_ID_SYSTEM"
              BusinessValidFrom:
                type: string
                example: ""
              BusinessValidTo:
                type: string
                example: ""
                .
                .
                .
```

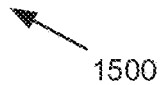

FIG. 15

INTELLIGENT ANNOTATION OF ENTITY-RELATIONSHIP DATA MODELS

BACKGROUND

Databases can be modeled in different ways. A database model shows the logical structure of a database, including the relationships and constraints that determine how data can be stored and accessed. For example, the conventional relational model sorts data into tables, each of which consists of rows and columns. Each row of a table represents one instance of an entity, and each field in the table represents an attribute type. A relationship between entities can be implemented by storing the primary key of one entity as a pointer or foreign key in the table of another entity. The relational model can account for various types of relationships, or cardinalities, between tables, such as one-to-one, one-to-many, and many-to-many cardinalities.

Another database model is the entity-relationship model, which describes interrelated things of interest in a specific domain of knowledge. An entity-relationship model typically includes entities (representing the things of interest) and specifies relationships between entities. An entity-relationship model generally describes, in a higher level than a relational model, what is important in certain operational processes. It typically presents a data schema in graphical form, instead of defining the processes directly. The cardinality between entities can be mapped as well. Depending on the level of abstraction, an entity-relationship model can be represented as a conceptual data model (CDM), which is more abstract, or a physical data model (PDM), which is less abstract. A relational model can be converted to a corresponding entity-relationship model or vice versa.

Database management has evolved from a centralized approach where corporate data are stored in one (or very few) large servers to a distributed approach where a distributed database management system (DDMS) governs the storage and processing of logically related data over interconnected computer systems in which both data and processing can be distributed among multiple sites. In DDMS, services (or micro services) can run as small logic units on multiple distributed machines, and multiple services may communicate with each other or share data via messages in order to achieve common goals. The messages exchanged between different components can contain forms of data that the DDMS wants to share like databases, objects, files, or the like. More recently, aligned data models have gained importance where a data provider can use a domain-flavored universal data schema for communication. The interchange can be business-object oriented, e.g., focusing on an atomic unit such as a customer or a product. Changes in objects of interest can be written into a pipeline or bus to which one or more services may subscribe. The message-oriented approach, however, can be challenging for a DDMS that incorporates entity-relationship database models. For example, users interacting with CDMs may find it difficult to translate operations on CDMs to numerous underlying database tables that have complex relationship. Conversely, users operate directly on database tables may find it difficult to synchronize such operations on CDMs. Thus, room for improvements exists for bidirectional mapping between relational model representation and conceptual model representation.

BRIEF DESCRIPTION OF THE DRAWINGS

FIG. 12 is a diagram illustrating an example database table represented by one entity illustrated in FIG. 11.

FIG. 13 is a diagram illustrating another example database table represented by another entity illustrated in FIG. 11.

FIG. 14 is an example message generated using a message structure corresponding to the logical entity illustrated in FIG. 11.

FIG. 15 show a portion of an example API document automatically generated based on the message structure of FIG. 14.

DETAILED DESCRIPTION

Example 1—Overview of Entity-Relationship Data Models

Figure 1:
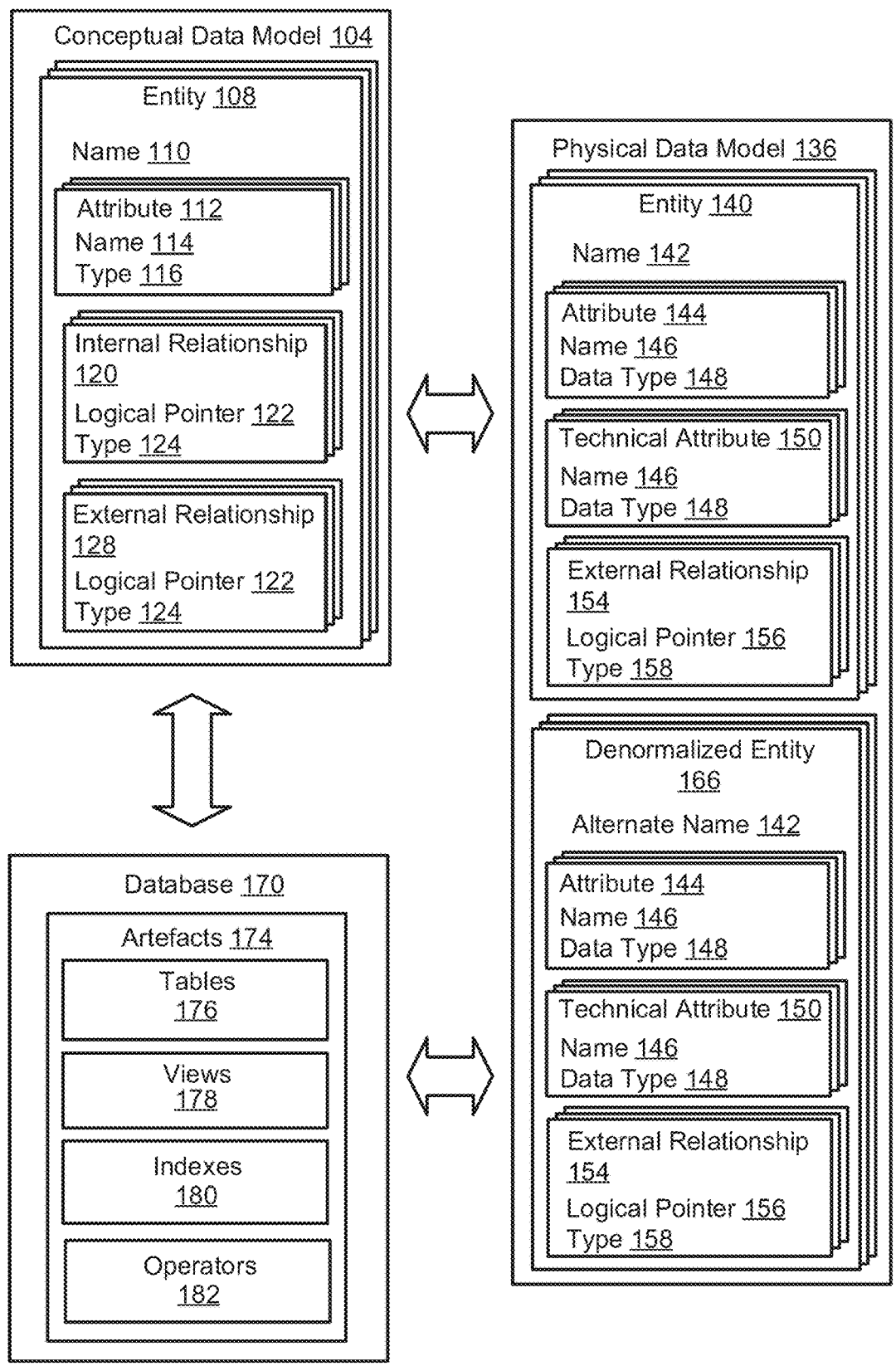
FIG. 1 is a diagram illustrating components of a conceptual data model, a physical data model, and a database, and their inter-relationship.

Databases are critical parts of many computer applications, including mission-critical applications for enterprises. Many databases, such as relational database systems, are intended to model data corresponding to items in the analog world. For example, database tables may be created to represent things like materials, products, customers, employees, sales orders, and the like. Database tables may be related to other database tables. For example, a material may be obtained from a supplier and incorporated into a product. The product may be the subject of sales order with a customer.

Database tables in a database system, and their relationships, can be very complex. It is not uncommon for enterprise level database systems to included hundreds or thousands of individual tables. Typically, a data model, or schema, for data can be constructed at a conceptual level, providing a conceptual data model (CDM). A CDM can describe different entities, and particular attributes that those entities have. For example, a table, or an entity, for an employee can be created, and can have attributes such as name, social security number, job title, and compensation rate. The CDM can also capture relationships between different entities.

Although called a CDM, the CDMs are typically represented in a computer-readable/computer-manipulable format. For example, entities and their relationships can be defined using software, which can store, or reproduce, the CDM. However, the CDM is typically not the data model used to implement data structures or data types, such as tables, in a database system.

Rather, a CDM can be used to create a physical data model (PDM). The PDM can add attributes, which can be referred to as technical attributes, to the CDM that may not describe a property of an analog world item, but rather may be useful in storing and retrieving data. Artificial primary keys may be created, for instance, that may be useful in distinguishing between particular records/entities in a database table, but which do not directly describe a property of the corresponding analog world item.

A PDM can be used to generate various database artefacts. For example, table definitions in a PDM can correspond to, or be used to generate, entries for a table in a data dictionary (or information schema) of a database system. Database artefacts can be, or can be used to produce, statements in a computer language, such as SQL, that can be used to add, modify, or delete tables. In particular, a PDM can be used to generate a data definition language statement that can be used to create an instance of a table having a structure defined in the PDM.

Both CDMs and PDMs are entity-relationship models, with different levels of abstractions of databases they represent. In practice, synchronization between a CDM and a corresponding PDM should be maintained so that changes made to the CDM can be timely and accurately reflected in the PDM, and vice versa. Such synchronization can be achieved manually or automatically. For example, certain database systems, including those provided by SAP SE, of Walldorf, Germany, provide mechanisms for bidirectional mapping between the CDM and the PDM. Such bidirectional mapping allows automatic transformation of a CDM into a PDM or database artefacts. As a result, changes can be automatically made to a complex database system from an easy-to-understand and high-level conceptual database model.

Example 2—Example Conceptual and Physical Data Model Components

FIG. 1 illustrates components typically used in an entity-relationship database model design. A CDM 104 can include a plurality of entities 108 (e.g., for customers, materials, invoices, employees, etc.). Each entity 108 can be associated with a name 110, which in the CDM 104 is typically a semantically meaningful, easy to understand name. Each entity 108 can include one or more attributes 112. Each attribute 112 can include a semantically meaningful and easy-to-understand name 114 and a type 116, which can be a general type, such as number, character, date, or currency, and may or not correspond to a data type that is used in a database table that corresponds to a given entity 108.

A given entity 108 can optionally be associated with one or more internal relationships 120 or one or more external relationships 128. As used herein, an internal relationship 120 refers to a relationship between two entities 108 where the relationship is not present in a PDM representation of a given entity, or in corresponding database artefacts. Example internal relationships 120 include inheritance, header/item relationships, and one-to-one cardinality relationships. In at least some examples, entities 108 having internal relationships 120 can be denormalized in generating an entity in a PDM or a table in a database. An internal relationship 120 can be associated with one or more logical pointers 122 to related entities 108 (or, in some cases, other types of schema elements of a CDM 104). An internal relationship 120 may also be associated with a type 124, which can identify a given internal relationship as an inheritance relationship, a one-to-one cardinality relationship, etc.

As used herein, an external relationship 128 refers to a relationship between two entities 108 where the entities remain distinct in a PDM/are represented by different database artefacts. Typically, entities 108 related by external relationships 128 are more semantically different than entities related by internal relationships 120. Examples of external relationships 128 include foreign key relationships (or joins) and associations. Like internal relationships 120, external relationships 128 can include one or more logical pointers 122 to related entities 108 and optionally can include a type 124 for the relationship (e.g., foreign key or association).

As noted above, the CDM 104 can be used to generate a PDM 136. The PDM 136 can include entities 140 that correspond to a single entity 108 of the CDM 104. In many cases, a name 142 for the entity 140 can be an alternate name that is less semantically meaningful than the name 110 of the corresponding entity 108 in the CDM 104. For example, in some database systems, names 142 may be assigned only a limited number of characters. As a result, it may be difficult to understand what data in an entity 140 represents just from the name 142.

An entity 140 can include one or more attributes 144, which correspond to the attributes 112 of the corresponding entity 108. However, as with the name 142, a name 146 for the attribute 144 can be less obviously meaningful than the name 114 of the corresponding attribute 112. As the PDM 136 is typically useable to generate database artefacts, the attributes 144 can be associated with a data type 148. The data type 148 can be a data type that is useable in a software environment used to implement a database, such as being a string having a defined maximum number of characters, an integer, a specific date format, a decimal value having a defined number of digits before and after a decimal point, etc.

An entity 140 can also include technical attributes 150. Technical attributes 150 can be useful in implementing a database system, but may not relate to a property of an analog world item that is modelled by a corresponding entity 108. Examples of technical attributes 150 can include fields used for data governance purposes, such as identifying a source system or particular users or processes that are authorized to change data in a particular entity 140, or a timestamp indicating a date that a record for the entity was last modified. The technical attributes 150 can include names 146 and data types 148.

An entity 140 can be associated with one or more external relationships 154. The external relationships 154 can include one or more logical pointers 156 and a type 158. The external relationships 154, logical pointers 156, and type 158 can be at least generally similar to the external relationships 128, logical pointers 122, and types 124 of the CDM 104. However, the values (or data type or other implementation details) of the logical pointers 122 or types 124 can be different for the entity 140 than for an entity 108 of the CDM 104. For example, a value assigned to a logical pointer 122 of an entity 140 can be a name 142 or a name 146 rather than a name 110 or a name 114.

The PDM 136 can include modified entities, shown in FIG. 1 as denormalized entities 166. In particular implementations, a denormalized entity 166 can combine multiple entities 108 of the CDM 104. For example, a denormalized entity 166 can include some or all of the entities 108 connected by internal relationships 120. A denormalized entity 166 can otherwise be similar to an entity 140, including a name 142, attributes 144, technical attributes 150, or external relationships 154. The attributes 144 and external relationships 154 can correspond to the attributes 112 and external relationships 128 of the constituent entities 108 of an entity 140.

The CDM 104 can also be used to produce artefacts 174 in a database system 170. In some cases, the artefacts 174 can be produced directly from the CDM 104. In other cases, the artefacts 174 can be produced from a PDM 136 that was produced from a CDM 104. As shown, the artefacts can include tables 176, views 178, indexes 180, and operators 182, which can be related, and in some cases defined with respect to one another. For example, two or more tables 176 can be related via foreign keys or associations. Views 178 can be defined with respect to one or more tables 176 or views 178. Indexes 180 can be defined with respect to tables 176 or views 178. Operators 182 can be configured to read, write, or perform other operations on the tables 176 and/or views 178.

In one embodiment, artefacts 174 for the database system 170 can be produced directly from the CDM 104. For example, the CDM 104 may be processed to generate statements in a data definition language to generate tables 176, views 178, indexes 180, and operators 182. In another embodiment, artefacts 174 for the database system 170 can be produced from the PDM 136, such as by generating data definition language statements for entities 140 in the PDM 136. Similar techniques can be used to update database artefacts 174 based on changes to the CDM 104 (e.g., deleting tables 176 and adding new tables having an updated schema, or modifying tables, such as by adding or dropping columns).

Example operators 182 can include translation operators, such as the read adapter and write adapter, which are respectively configured for performing message read operations and message write operations, are described more fully below. Generation of such translation operators from the CDM 104 or PDM 136 can be technically challenging because it involves bidirectional mapping between the respective data model 104 or 136 and the underlying tables 176 and/or views 178. The present disclosure provides a number of techniques for automatically generating such translation operators (e.g., the read and write adapters) from the CDM or PDM by means of intelligent annotation of the data models. Such intelligent data model annotation technologies can be applied across a wide variety of enterprise software environments.

For simplicity, the data models described below refer to entity-relationship data models, which can be CDMs or PDMs. Unless otherwise indicated, CDMs are described in the examples below to illustrates the disclosed technologies, although it is to be understood that the same technologies can also apply to PDMs.

Figure 2:
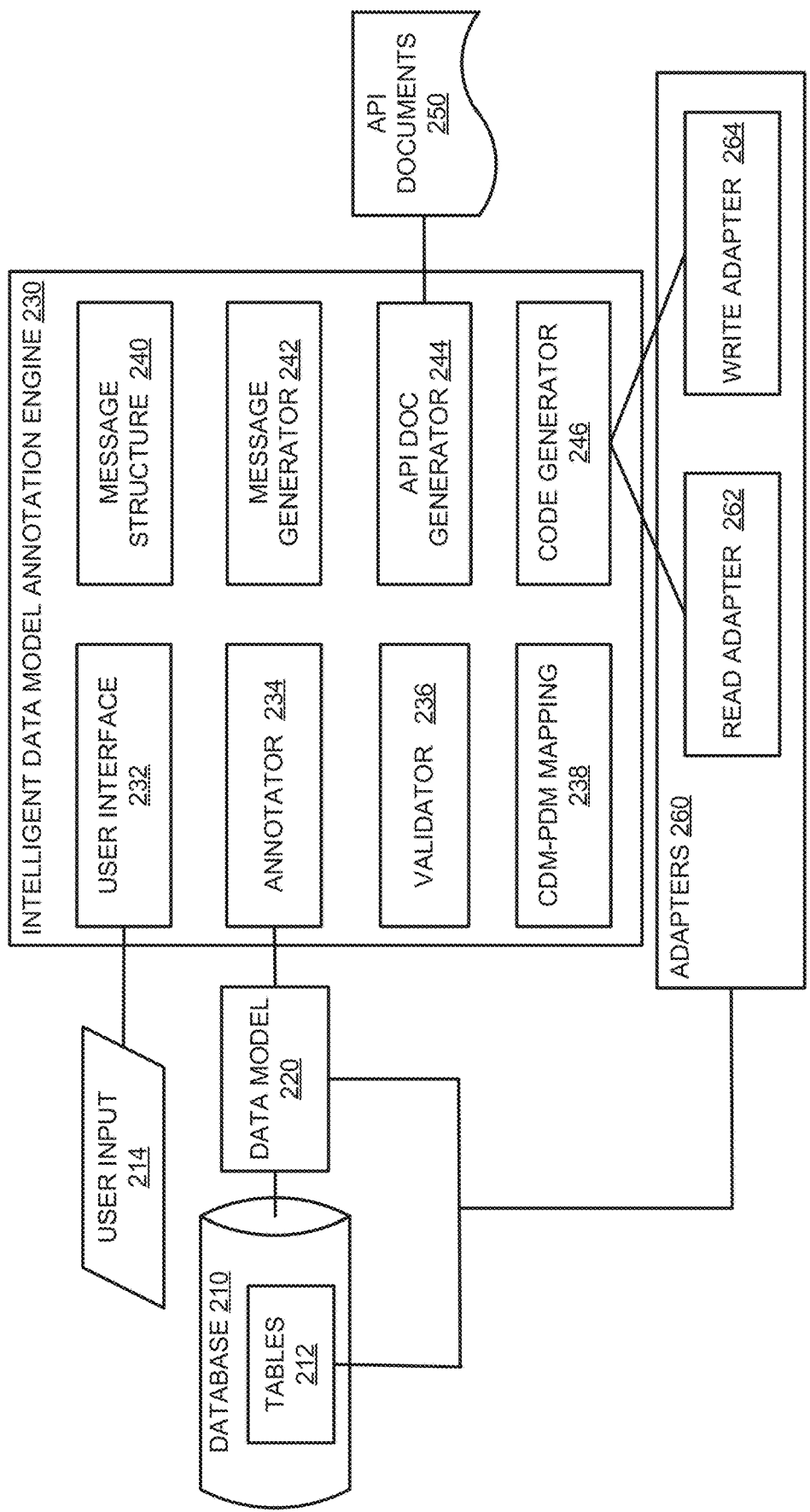
FIG. 2 is an overall block diagram of an example distributed database management system based on intelligent data model annotation technology disclosed herein.

Example 3—Example Overview of Intelligent Distributed Database Management System FIG. 2 shows an overall block diagram of an example intelligent distributed database management system 200 supporting bidirectional mapping and message translation between data models and the underlying database tables.

As shown, the intelligent distributed database management system 200 includes a database 210, which can be a collection of multiple interconnected databases that are distributed across multiple sites and communicate with each other via a computer network. The database 210 can have a plurality of database tables 212 organized in a relational model. The database 210 can be represented by a data model 220, such as a CDM (or PDM) described above, which provides a conceptual view of the database 210 in terms of entities and relationship between the entities.

The intelligent distributed database management system 200 also includes an intelligent data model annotation engine 230. As shown, the intelligent data model annotation engine 230 includes a user interface 232 configured to interface with a user input 214, an annotator 234 configured to generate an annotation of the data model 220, and a validator 236 configured to validate the annotation generated by the annotator 234. The intelligent data model annotation engine 230 can have a message generator 242 which can be configured to generate message structures 240 based on the annotated data model, and then generate messages based on the message structures 240. The intelligent data model annotation engine 230 can also have an API document generator 244 configured to automatically generate application programming interface (API) documents 250 at least partially based on the message structures 240. Additionally, the intelligent data model annotation engine 230 can have a CDM-PDM mapping unit 238. The CDM-PDM mapping unit 238 can be configured to implement bidirectional mapping between the CDM and the PDM representing the database 210 (e.g., as in certain database products of SAP SE, of Walldorf, Germany), or retain results of such bidirectional mapping. Further, the intelligent data model annotation engine 230 can include a code generator 246 configured to generate adapters 260, such as a read adapter 262 and a write adapter 264, as artefacts of the database 210. As described further below, the read adapter 262 and write adapter 264 can be used for bidirectional mapping between the data model 220 and the database tables 212 through message read and message write operations, respectively.

In practice, the systems shown herein, such as system 200, can vary in complexity, with additional functionality, more complex components, and the like. For example, there can be additional functionality within the intelligent data model annotation engine 230. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the data models, annotations, message structures, messages, adapters, and the like can be stored in one or more computer-readable storage media or computer-readable storage devices. The technologies described herein can be generic to the specifics of operating systems or hardware and can be applied in any variety of environments to take advantage of the described features.

Example 4—Example Cloud-Based Intelligent Data Model Annotation Services

In certain examples, the intelligent data model annotation engine can be implemented in a customer computer, for example, as a part of an on-premise enterprise resource planning software installed on a company's local computers or servers. In other embodiments, the intelligent data model annotation engine can be implemented in a cloud which is hosted on a vendor's servers and can be accessed through a web browser.

Figure 3:
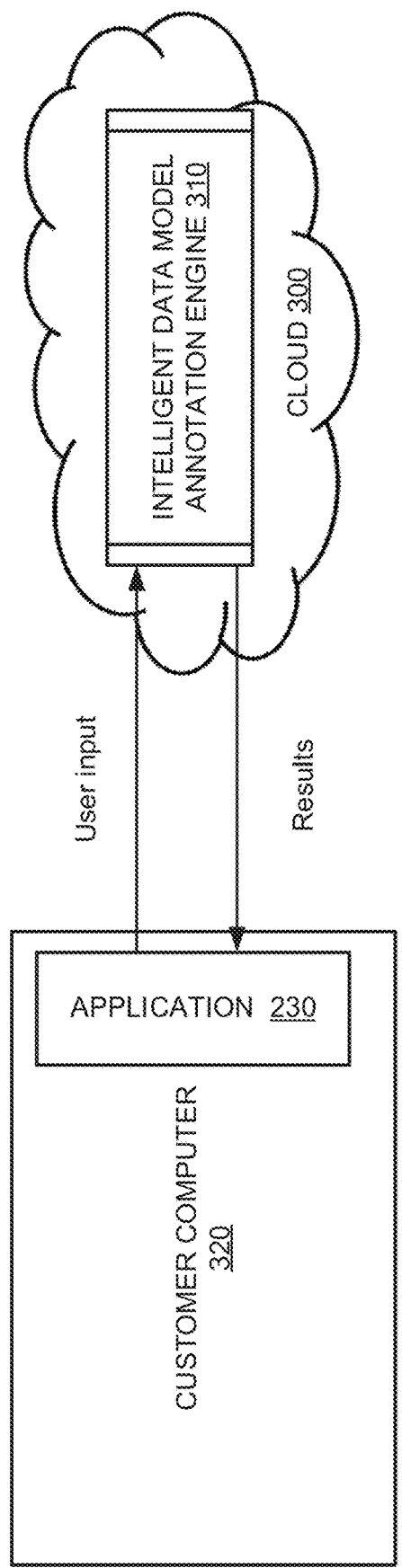
FIG. 3 is a block diagram illustrating an example cloud-based intelligent data model annotation engine in communication with a software application running on a customer computer.

For example, FIG. 3 shows an intelligent data model annotation engine 310 (similar to 230) located on a cloud 300. A customer computer 320 can run a software application 330, which includes an application programming interface that can communicate with the cloud-based intelligent data model annotation engine 310. Specifically, the application 330 can make remote calls and send the user input (e.g., a data model, user's annotations, etc.) to the intelligent data model annotation engine 310. Then the intelligent data model annotation engine 310 can return the results (e.g., message structures, ADI documents, adapters, etc.) from the intelligent data model annotation engine 310 to the application 330.

Figure 4:
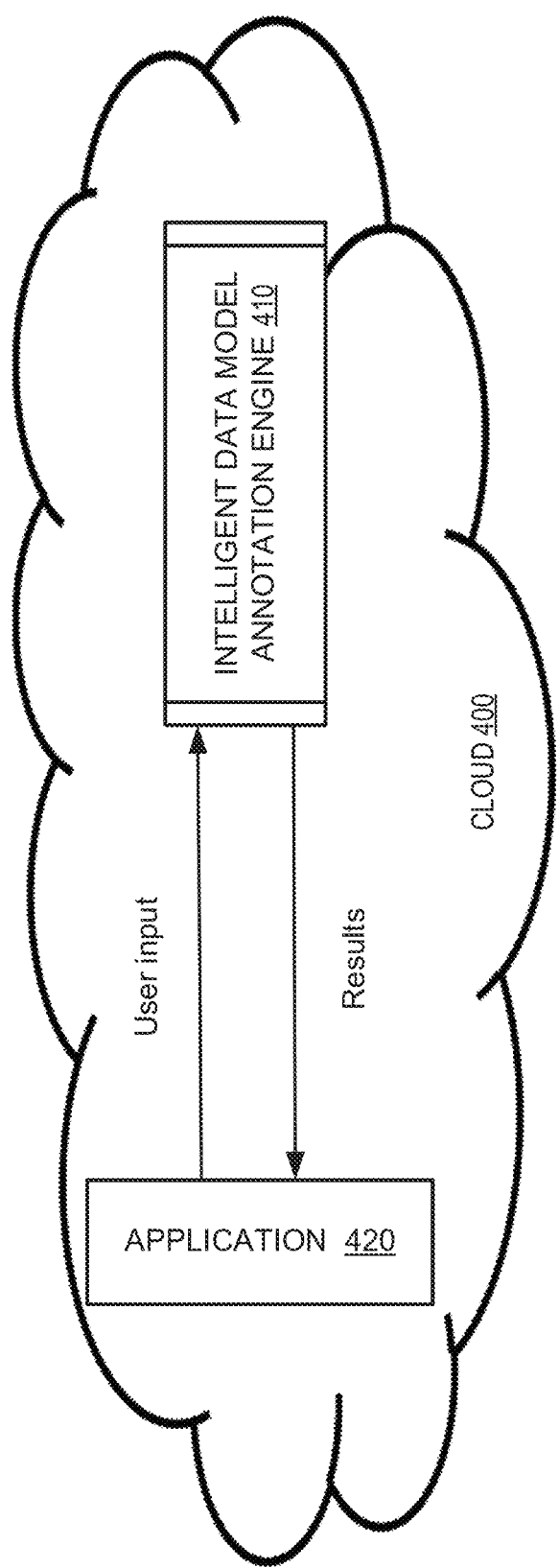
FIG. 4 is a block diagram illustrating an example cloud-based intelligent data model annotation engine integrated with a subscription-based software application running in the cloud.

In another example, the intelligent data model annotation service can be run completely in the cloud and a customer can subscribe to such a service. As shown in FIG. 4, in such circumstances, both the intelligent data model annotation engine 410 (similar to 230) and the software application 420 that calls for service and receives results from the intelligent data model annotation engine 410 can be run on the cloud 400.

Figure 5:
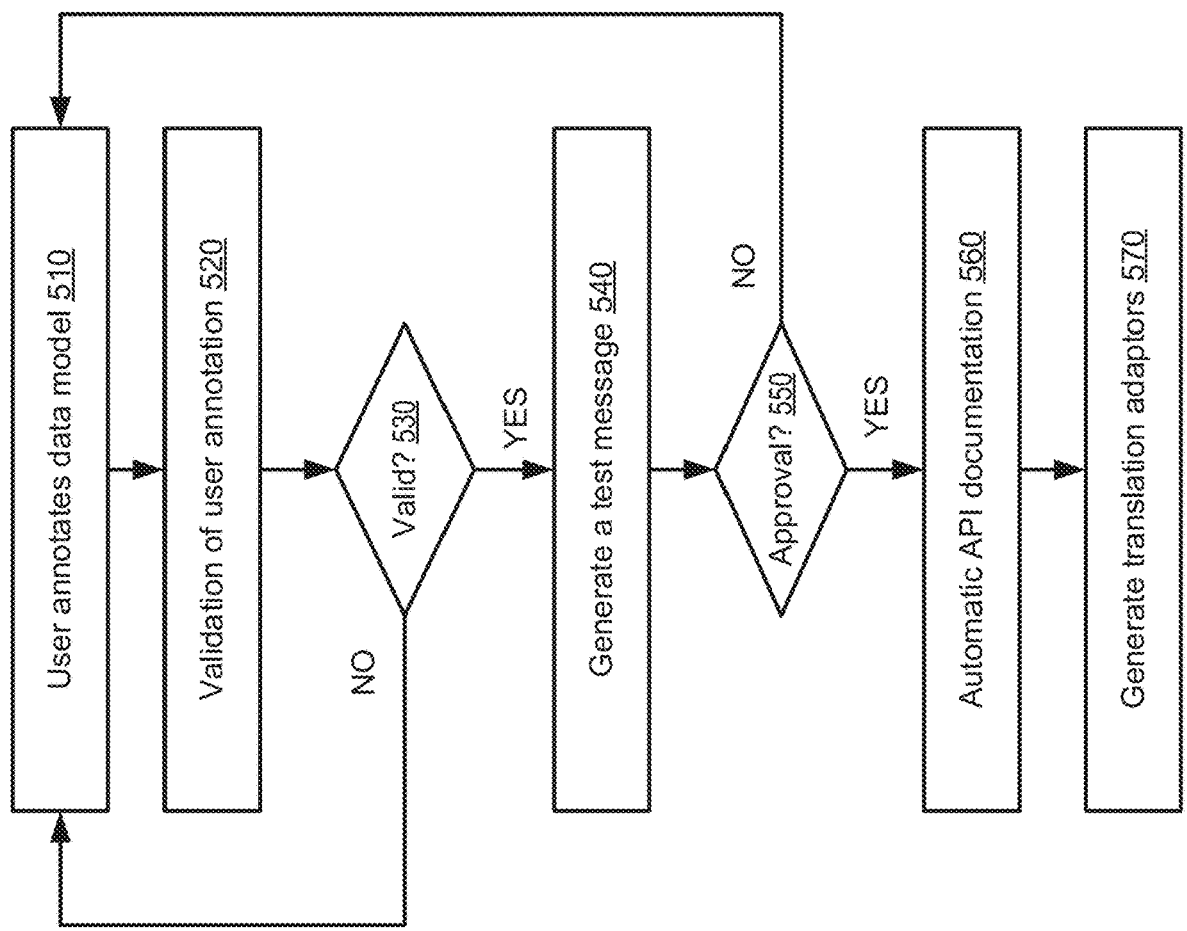
FIG. 5 is a flowchart illustrating an example overall method of efficient distributed database management based on intelligent data model annotation.

Example 5—Example Method of Generating Message Structure for Bidirectional Translation Between Data Models and Database Tables FIG. 5 is a flowchart 500 of an example overall method of efficient distributed database management based on intelligent data model annotation, and can be performed, for example, by the system 200 of FIG. 2.

At 510, a user can annotate the data model (e.g., 220). At 520, the user's annotation of the data model can be subject to a validation test, and the validation results can be checked at 530. If the user's annotation is invalid, the method can return to 510 so that the user can re-annotate the data model. If the user's annotation of the data model passes the validation, the method can generate a test message at 540. As described below, the test message can have a message structure automatically generated from the annotated data model. The method can present the test message to the user and seek user's approval 550. If the user is not satisfied with (i.e., disapprove) the test message, the method can again return to 510 and force the user to re-annotate the data model. On the other hand, if the user approves the test message, the method can proceed to 560 and generate API documents at least partially based on the message structures. At 570, the method can further generate translation operators such as a read adapter and a write adapter which can be used to for bidirectional translation between the data model and database tables represented by the data model.

Figure 6:
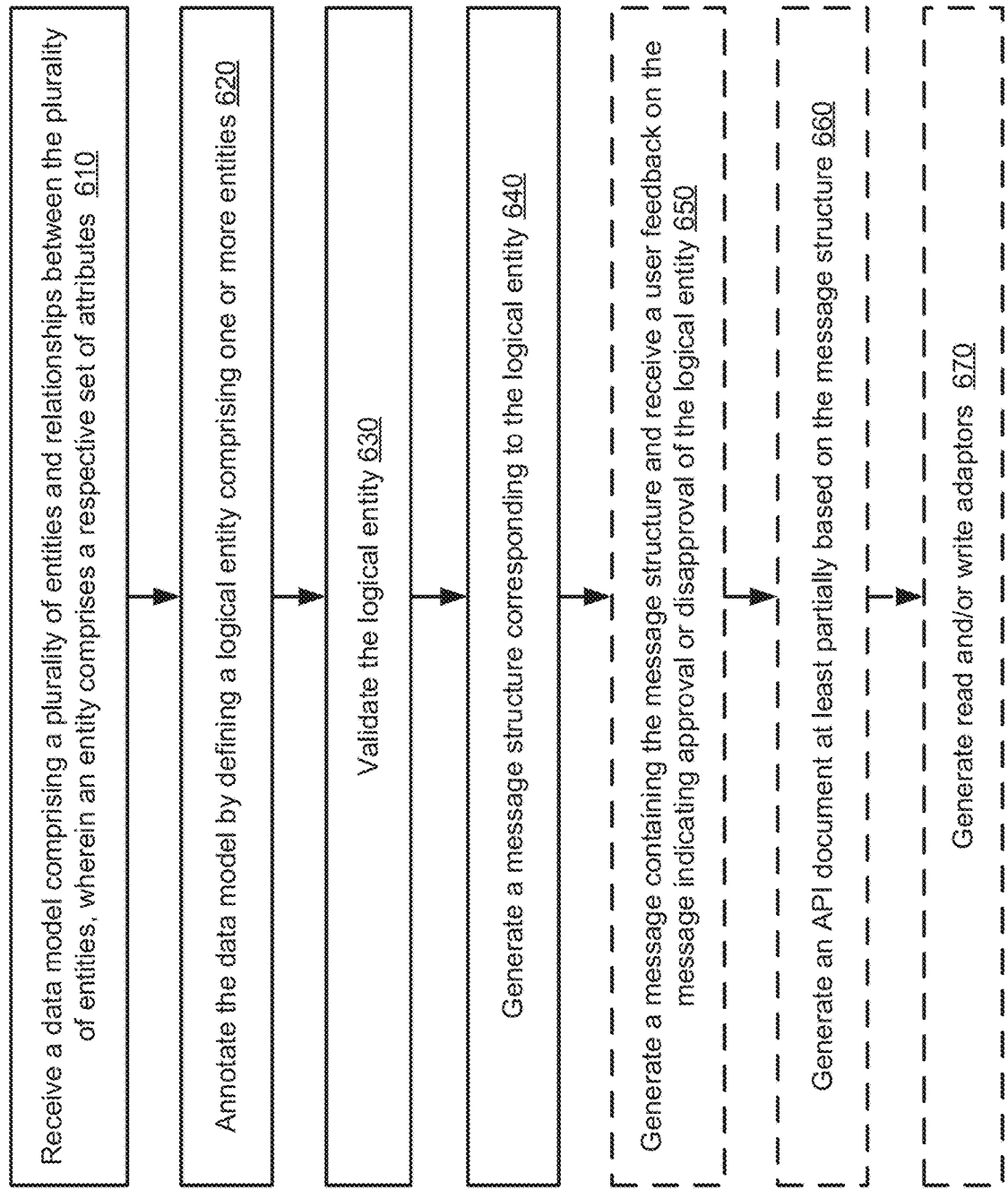
FIG. 6 is a flowchart illustrating an example method for generating a message structure for bidirectional message translation between data models.

FIG. 6 is a flowchart 600 illustrating an example method of generating a message structure and additional database artefacts, and can be performed, for example, by the intelligent data model annotation engine 230 of FIG. 2.

At 610, the intelligent data model annotation engine can receive a data model including a plurality of entities and relationships between the plurality of entities, wherein an entity can include a respective set of attributes. At 620, a user can annotate the data model (e.g., via the user interface 232 and the annotator 234) by defining a logical entity that includes one or more entities. At 630, the logical entity defined by the user's annotation can be validated (e.g., by the validator 236). After a successful validation, a message structure (e.g., 240) corresponding to the logical entity can be generated (e.g., by the message generator 242).

Optionally, at 650, the intelligent data model annotation engine can automatically generate a message (e.g., via the message generator 242) containing the message structure and receive a user's feedback on the message indicating approval or disapproval of the logical entity.

Optionally, at 660, the intelligent data model annotation engine can automatically generate an API document (e.g., via the API document generator 242) at least partially based on the message structure.

Optionally, at 670, the intelligent data model annotation engine can automatically generate a read adapter and/or a write adapter (e.g., via the code generator 246).

The method depicted in flowcharts 500 and 600 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 6—Example Conceptual Data Model

Figure 7:
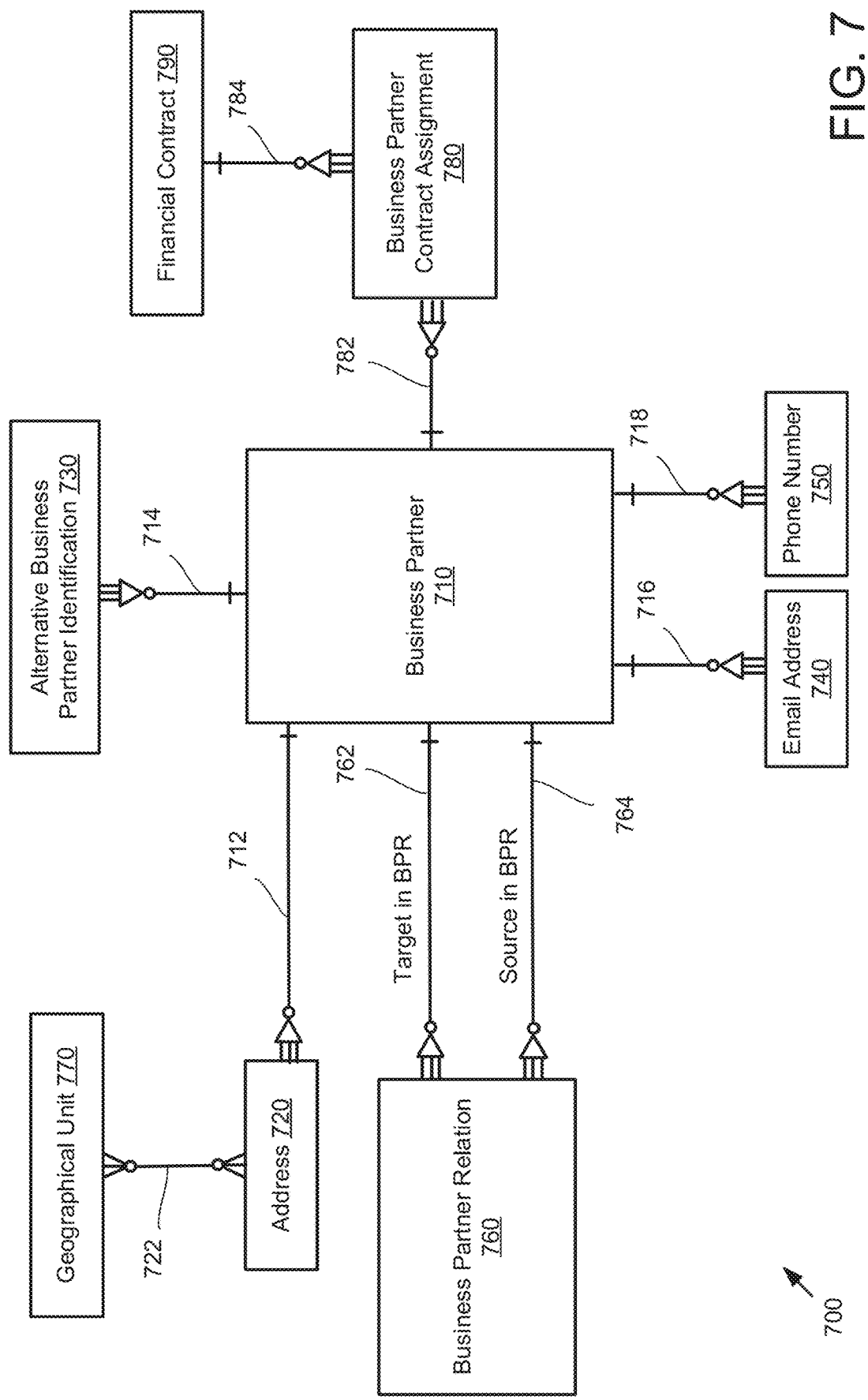
FIG. 7 is a diagram illustrating an example conceptual data model comprising entities and relationships between the entities.

FIG. 7 illustrates an example conceptual data model 700 (or a physical data model) with standard schema notations.

The depicted data model 700 can be a portion or subset of a larger entity-relationship data model (e.g., the FSDM Business Partner Model provided by SAP SE, of Walldorf, Germany) representing a database.

As shown, the data model 700 includes nine entities including: a Business Partner entity 710, an Address entity 720, an Alternative Business Partner Identification entity 730, an Email Address entity 740, a Phone Number entity 750, a Business Partner Relation entity 760, a Geographical Unit entity 770, a Business Partner Contract Assignment entity 780, and a Financial Contract entity 790. Each entity represents a corresponding thing, which can be an object, an event, or a concept. For example, the entity 790 represents financial contract object, as its semantically meaningful name "Financial Contract" indicates. Each entity can have one or more attributes, as described below. For simplicity, attributes within the entities are not shown in FIG. 7 (see, e.g., FIG. 11 for examples of attributes in entities).

Entities in the data model 700 are associated with each other via external relationships, which can have different cardinalities. For example, the Financial Contract entity 790 has a one-to-many cardinality relationship with the Business Partner Contract Assignment entity 780, indicating a financial contract can be linked to many business partner contract assignments. Particularly, the Financial Contract entity 790 can have a primary key attribute that is configured to contain unique values, whereas the Business Partner Contract Assignment entity 780 can have foreign key attributes that are linked to the primary key attributes of the Financial Contract entity 790, and are configured to allow multiple instances of the same value. Similarly, the Business Partner entity 710 has respective one-to-many cardinality relationships 712, 714, 716, 718, and 782 with entities 720, 730, 740, 750, and 780. In addition, the Business Partner entity 710 has two one-to-many cardinality relationships with the Business Partner Relation entity (BPR) 760: a target relationship 762 and a source relationship 764, indicating a business partner can be both a target and a source of multiple business partner relations. Further, the data model 700 shows that the Address entity 720 has a many-to-many cardinality relationship with the Geographical Unit entity 770, indicating an address can be assigned to multiple geographical units, and a geographical unit can be assigned to multiple addresses.

Example 7—Example Annotation of Data Model

Figure 8:
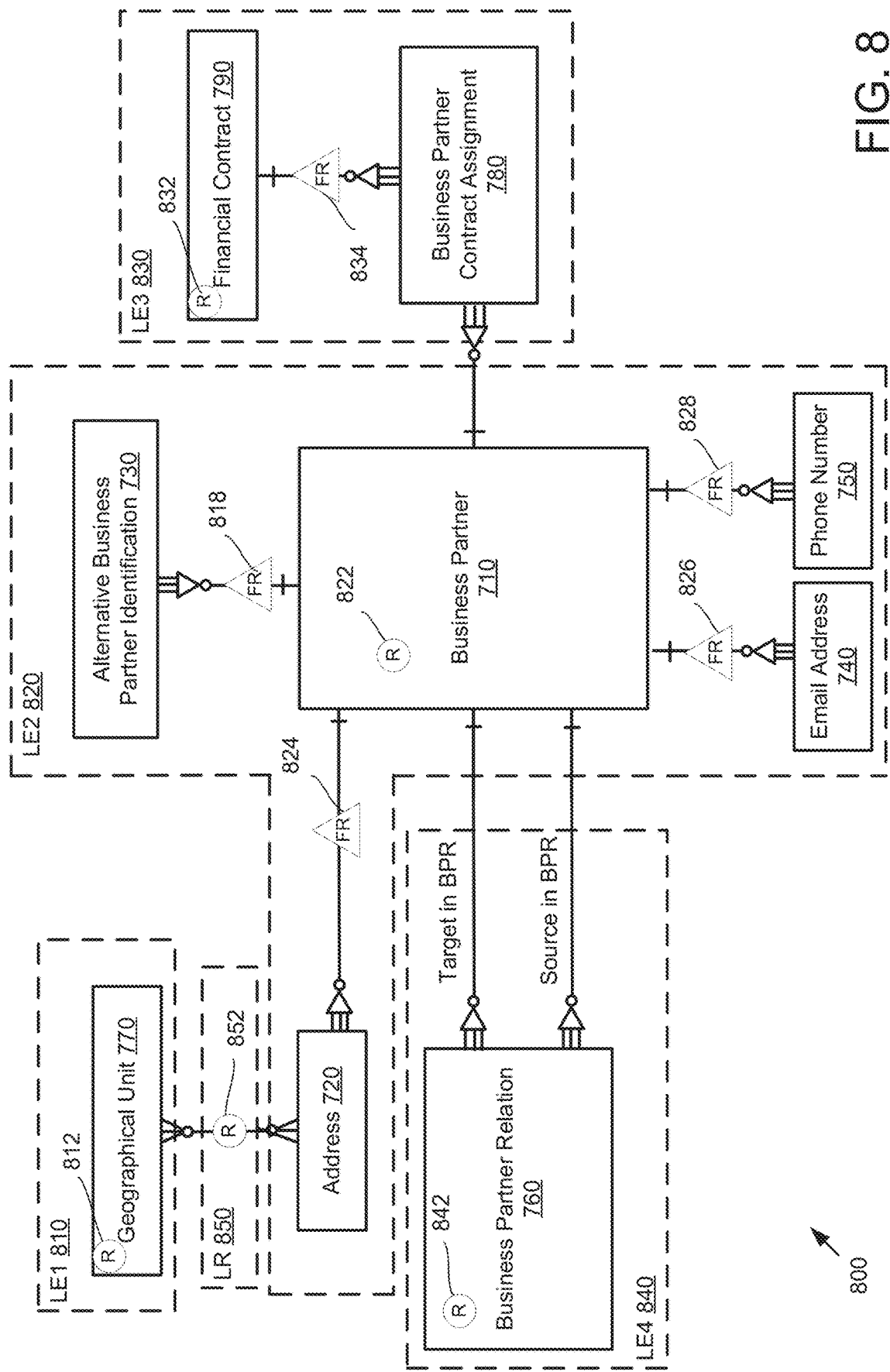
FIG. 8 is a diagram illustrating an example annotation of the conceptual data model depicted in FIG. 7.

As described herein, user annotation of data model can include selection of logical units, designation of roots and follow relationships within the logical units, and optionally marking relevancy or irrelevancy of attributes within certain entities. Annotation of data model can be implemented, e.g., by the annotator 234 in conjunction with the user interface 232. FIG. 8 shows a diagram 800 illustrating an example annotation of the data model 700. Additional examples of user annotation via a graphical user interface are described further below. The symbols or legends used for the annotation can vary and be user-defined.

As described herein, a data model can be annotated by a user to create one or more logical units, where a logical unit can be a logical entity (LE) or a logical relationship (LR). An LE can include on or more entities that the user thinks are logically related to each other such that the creation and/or modification of one entity within the LE will only affect (e.g., cause corresponding changes of) entities contained in the LE but not affect other entities that are outside the LE. In other words, the user makes a conscious decision that some entities are closely related to each other and they should be grouped into one LE. On the other hand, the LR is a special type of logical unit that includes a many-to-many cardinality relationship between two entities, which physically needs to be resolved in its own database table. As described further below, each logical unit (LE or LR) is self-contained and can be used to generate a corresponding message structure.

In the depicted example, the nine entities included in the data model 700 are grouped into four logical units LE1-LE4, as indicated by four non-overlapping areas respectively enclosed by the dashed boundary lines. Specifically, LE1 810 contains the entity 770 only; LE2 820 contains five entities: 710, 720, 730, 740, and 750; LE3 830 contains two entities: 780 and 790; and LE4 840 contains the entity 760 only. In addition, a logical relationship LR 850 is annotated for the many-to-many cardinality relationship between entities 710 and 720.

As described herein, the user can annotate a root (also referred to as root entity or anchor entity) within each logical unit. For an LR that contains no entity, the many-to-many cardinality relationship represented by the LR can be automatically designated as the root. For an LE containing only one entity, the entity can be automatically designated as the root. For an LE containing multiple entities, the user can select the root so that it is feasible to traverse to all other entities within the LE from the root by following the relationships between pairs of connected entities. Each traversed relationship between two entities can be annotated as a follow relationship (FR). In other words, such traversed paths within an LE can form a tree-like structure where all entities contained in the LE can be directly or indirectly linked to the root via one or more FRs.

In the depicted example, the many-to-many cardinality relationship between entities 710 and 720 is marked as a root 852 (represented by the symbol of a circled R) for the logical relationship LR 850. The single entity 760 contained in LE4 840 is designated as a root 842 for LE4 840. Within the LE3 830, the entity 790 is marked as a root 832 and the relationship between entities 780 and 790 is marked as a FR 834. For the LE2 820, the business partner 710 is annotated as a root 822 and its relationships to other entities contained within LE2 are annotated as respective FRs, e.g., 824, 826, 828, and 818. Note that each annotated FR is between two entities contained within the same LE, and no FR exists between two entities that belong to two different LEs. In other words, a FR between two entities cannot cross the boundary that defines the LE containing the two entities.

Although in the depicted example, each FR connects a root entity with a non-root entity (e.g., FR 824 connects the root 822 with entity 720), a FR can be annotated to two non-root entities in some circumstances provided that such FR does not create a loop. For example, if another entity, assuming a new entity named Zip Code, which has a one-to-many cardinality relationship with entity Address 720 is also included in LE2 820, a FR can be annotated between the new entity Zip Code and the entity Address 720. On the other hand, a FR can be not annotated between the entities 740 and 750 because it will create a loop between three entities (i.e., 710, 740, and 750) through two other FRs (i.e., 826 and 828).

In one embodiment, after the logical units (including LE and LR) are selected by a user and the respective roots are annotated (via automatic designation or manual selection), the FRs within each LE containing multiple entities can be automatically created (e.g., by traversing all entities within the LE) initially, and then manually corrected (e.g., to prune off any FR that would otherwise create loops.

In some embodiments, for any of the entities, the user can further annotate some attributes within the entities as irrelevant, or alternatively, the user can annotate some attributes within the entities as irrelevant. An example of annotating relevancy or irrelevancy of selected attributes within entities are described further below.

Example 8—Example Method of Validating User Annotations

Given a user's annotation of data model as described above, an automatic validation process can be performed to check whether the user's annotation violates any of the predefined boundary constraints or criteria (see, e.g., step 530 in FIG. 5 and step 630 in FIG. 6). If there is no constraint or criterion violation, the process can continue (e.g., generate message structures and a test message). Otherwise, an error or warning can be displayed to the user (e.g., via the user interface 232), who can re-do the data model annotation. The validation process can be performed, e.g., by the validator 236.

As described herein, multiple checks can be performed automatically during the validation process. For example, one criterion can be that there is no-overlap between user selected logical units. In other words, no entity can belong to more than one logical units. Another criterion can be that each logical unit must have exactly one root. In other words, an error or warning will be generated if two or more entities in a logical unit are designated as roots or if the user did not designate a root within a logical unit. A third criterion can be each logical relationship must connect two logical entities having a many-to-many cardinality relationship. Yet a further criterion can be that no loop is formed between entities through the follow relationships, as noted above. Specifically, if each entity in an LE is interpreted as a node in a graph and each follow relationship is interpreted as a directed edge in a graph, then the graph must be a directed acyclic graph (DIAG) where it is not possible to traverse the nodes and edges in infinite cycles.

Figure 9:
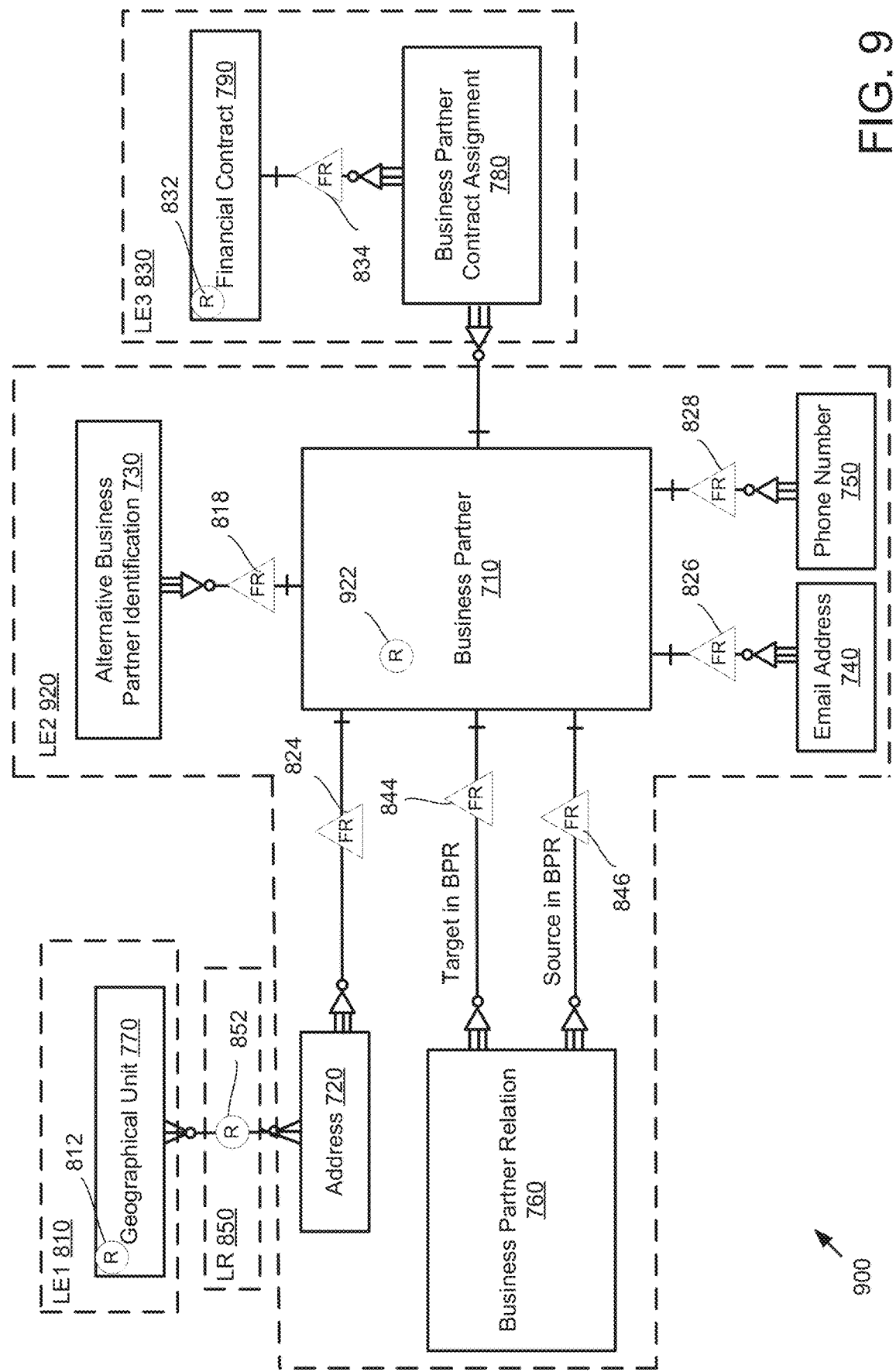
FIG. 9 is a diagram illustrating another example annotation of the conceptual data model depicted in FIG. 7.

As an example, FIG. 9 shows a diagram 900 illustrating another annotation of the data model 700 that is similar to the annotation shown in FIG. 8, except that there is no logical entity LE4 840. Instead, the logical entity LE2 920 is more expanded than 820, including not only entities 710, 720, 730, 740, and 750, but also the Business Partner Relation entity 760. In addition, the entities 710 and 760 are linked by two follow relationships 844 and 846. In this example, the automatic validation process will generate an error or warning to the user because an endless loop between entities 710 and 760 is formed by the LRs 844 and 846, thus violating the DIAG criterion.

Example 9—Example Overall Method of Generating Message Structures and Test Message After the user's annotation of the data model has been validated, the annotated data model can be transformed or translated into message structures (e.g., 240), e.g., by the message generator 242. Afterwards, the message structures can be filled with sample data to generate a test message (e.g., by the message generator 242), which can be presented to the user (e.g., via the user interface 232) and seek the user's feedback (see, e.g., steps 540-550 in FIG. 5 and steps 640-650 in FIG. 6). How the sample data is obtained can be flexible and many approaches can be used. For example, the sample data can be pre-defined semantic values from certain code lists, randomize values generated according to different data types, and/or use pre-defined default values corresponding to different attributes. If the user is satisfied with (i.e., approves) the test message, the process can continue (e.g., generate API documents and translation adapters). Otherwise, the user can repeat the data model annotation.

As described herein, each logical unit (which can be an LE or an LR) can be configured to generate a corresponding message structure. Each message structure is self-contained and can map a logical unit to corresponding database tables represented by the logical unit. Specifically, the message structure for a logical entity contains data fields organized a predefined message format (e.g., the JavaScript Object Notation, or JSON). The data fields in a message structure can map relevant attributes of all entities contained in the logical unit to respective properties (column names) in corresponding database tables represented by the logical unit. In addition, data fields in a message structure can contain direct and/or indirect references. Direct references correspond to follow relationships between entities contained in a logical entity. Indirect references correspond to relationships that cross boundaries of logical units.

According to one example embodiment, a traversing method can be used to translate a logical entity into a corresponding message structure. Specifically, for each logical entity, the message generator 242 can traverse from its root entity to all other entities (e.g., through annotated follow relationships) included in the logical entity, and translate relevant attributes and references contained in each traversed entity into respective properties of the underlying database tables. As noted above, the traversed paths within a logical entity can form a tree-like structure linking all enclosed entities and satisfying the DIAG criterion. Thus, the traversing method described herein can ensure relevant attributes and references of all entities contained in the logical unit are properly mapped to respective data fields in the message structure, and no endless loop is formed when traversing the entities.

Figure 10:
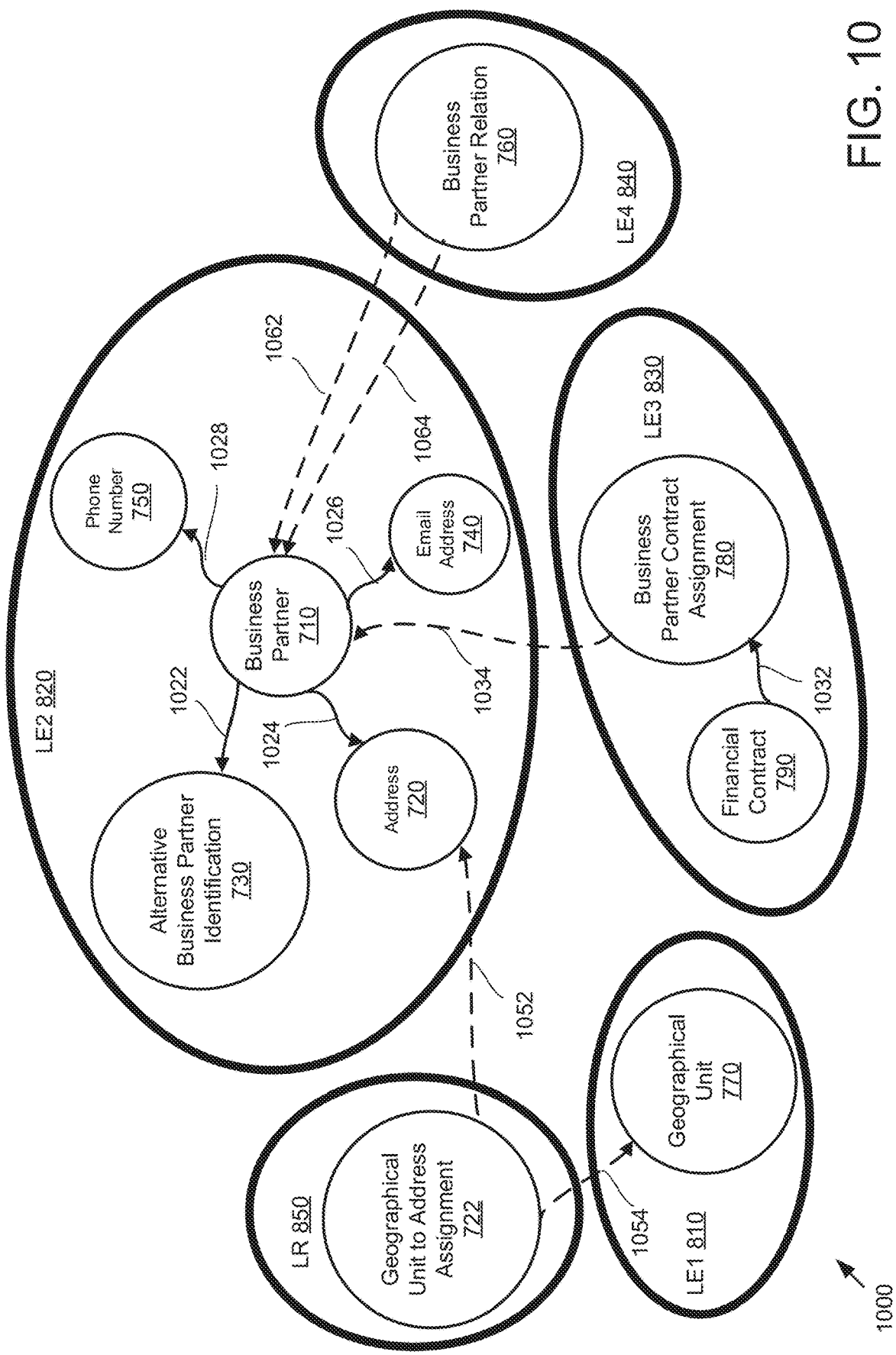
FIG. 10 is a diagram illustrating a topographical relationship between logical units that are annotated according to FIG. 8.

As an example, FIG. 10 shows a diagram 1000 illustrating a topographical relationship between logical units that are annotated according to FIG. 8. As shown, each of the logical units (e.g., 810, 820, 830, 840, and 850) can be transformed or translated into a corresponding message structure. The follow relationships between entities can be translated into respective internal references (e.g., 1022, 1024, 1026, 1028, and 1032) in the corresponding message structures, whereas the relationships that connect different logical units can be translated into indirect references (e.g., 1034, 1052, 1054, 1062, and 1064) in the corresponding message structures.

Example 10—Example Method of Translating Attributes and Relationships within a Logical Unit to Data Fields in a Message Structure As described herein, the message structures generated from the logical units can be represented in JSON format, wherein data fields can be represented by a property and value pair. In other examples, the message structures can be represented in other data exchange formats (e.g., XML, YAML, Smile, JsonML, etc.).

As described herein, attributes in a logical entity can be translated into JavaScript scalars in the corresponding message structure. Depending on the property type, the translated scaler can be number, string, Boolean, or null. Follow relationships within the logical entity can be translated based on the cardinalities of the relationships. Specifically, a one-to-many cardinality relationship can be translated into an object array; a one-to-one cardinality relationship or a many-to-one cardinality relationship can be translated into a scaler which is the direct reference to a target field or property; and a many-to-many cardinality relationship can be translated into an object array. The message structure can be nested. For example, an object array can include multiple objects, one of which can be another object array. The DIAG criterion described above can ensure that the message structure has a finite number of nesting levels.

For example, assume a Business Partner (e.g., 710) has multiple Addresses (e.g., 720). Such one-to-many cardinality relationship can be translated into an object array in the message structure, i.e., a class member including an array of multiple Addresses linked to the Business Partner. In another example, assume a Business Partner has a one-to-one cardinality relationship with another entity named Product (e.g., the Business Partner can purchase only one Product), such one-to-one cardinality relationship can be translated into a scaler in the message structure, which is a reference (e.g., identifier) or logical pointer pointing to the Product, instead of including the Product itself in the message structure.

Due to the nesting nature of the message structures, if a first entity has a one-to-many cardinality relationship with a second entity, and these two entities form a part of the DIAG in a logical entity, then the foreign key attributes in the first entity linked to corresponding primary key attributes of the second entity can be excluded from translating into the message structure. For example, as shown in FIG. 10, the foreign key attributes contained in Financial Contract 790 (linked to the primary key attribute contained in entity 780) can be excluded from translating into the message structure corresponding to the logical entity LE3 830. Similarly, the foreign key attributes contained in Business Partner 710 (respectively linked to entities 720, 730, 740, and 750) can be excluded from translating into the message structure corresponding to the logical entity LE2 820. On the other hand, foreign key attributes are translated into the message structures if the containing entity has an indirect reference (e.g., 1034, 1052, 1054, 1062, and 1064) to another entity. Examples of exclusion or inclusion of foreign key attributes when translating logical entities into message structures are described further below.

Example 11—Example Transformation from a Logical Entity to a Message Structure

FIGS. 11-14 show a specific example of transformation or translation from a logical entity to a corresponding message structure.

Figure 11:
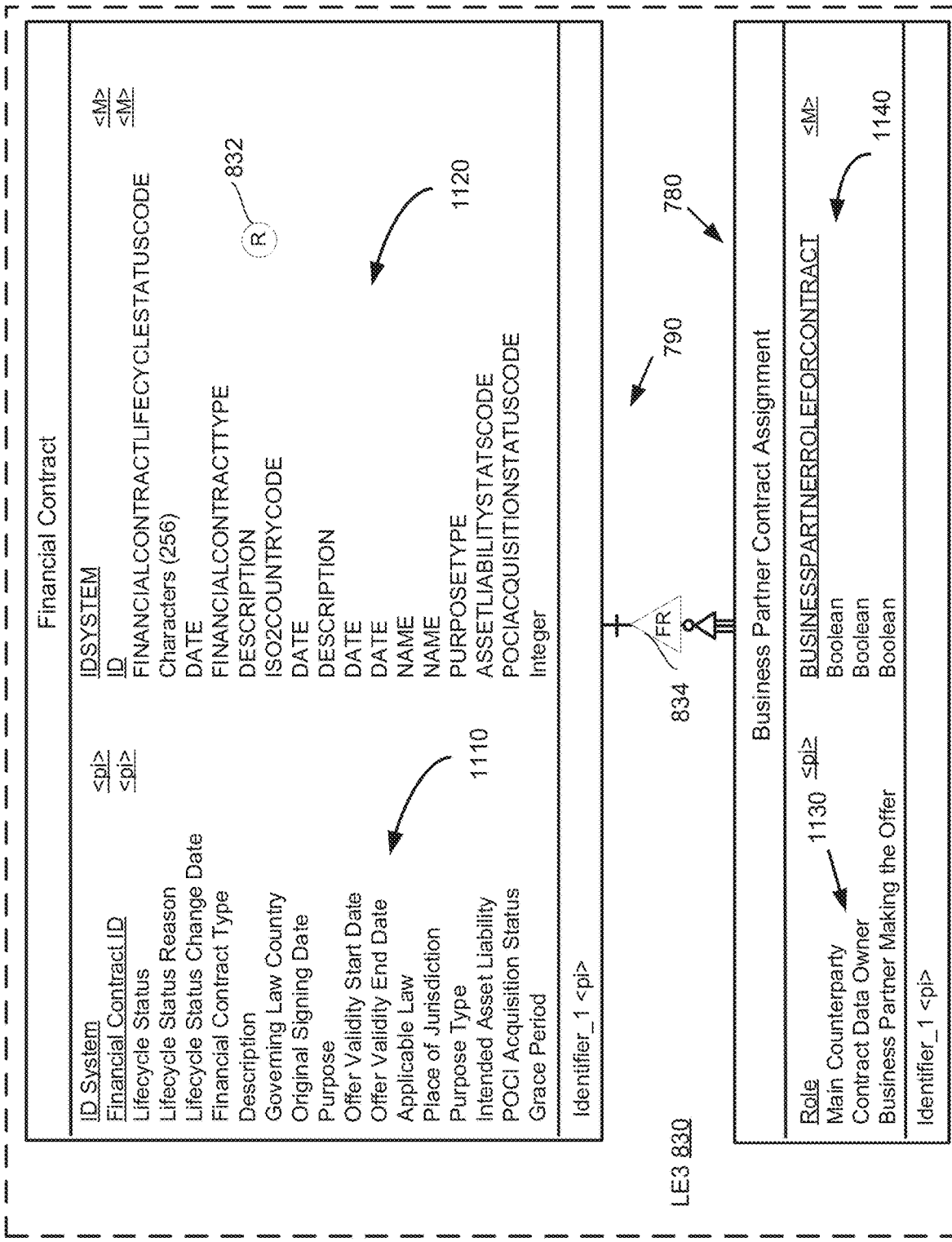
FIG. 11 is a diagram illustrating example attributes of two entities contained in a logical unit that is annotated in FIG. 7.

FIG. 11 shows detailed field information of two entities Financial Contract 790 and Business Partner Contract Assignment 780 contained in the logical entity LE3 830 according to the annotation illustrated in FIG. 8. As shown, the entity 790 includes a plurality of semantically meaningful attributes 1110 (e.g., "Lifecycle Status Reason," "Original Signing Date," "Applicable Law," "Grace Period," etc.) and respective types 1120 (e.g., Characters (256), DATE, NAME, Integer, etc.) corresponding to the attributes 1110. Similarly, the entity 780 also includes a set of semantically meaningful attributes 1130 (e.g., "Main Counter Party," etc.) and respective types 1140 (e.g., Boolean, etc.) corresponding to the attributes 1130. In addition, at least one attribute in each entity is a primary key attribute (underlined and denoted by <pi>). For example, the entity 790 has two primary key attributes: "ID System" and "Financial Contract ID," and the entity 780 has one primary key attribute "Role." Note that the foreign key attributes contained in the entity 780 (e.g., the foreign key attributes linked to the primary key attributes of the entity 790) are not displayed.

FIG. 12 shows an example database interface 1200 displaying a database table 1210 represented by the Financial Contract entity 790 depicted in FIG. 11. The database table 1210, which has a single row or record ("FINANCIALCONTRACTID"="My Contract 1"), can be retrieved after running a SELECT statement 1220. The SELECT statement 1220 specifies properties of the database table 1210 to be returned, where each property corresponds to a specific column (e.g., "FINANCIALCONTRACTID," "BusinessValidFrom," etc.) in the database table 1210. Comparing FIG. 12 to FIG. 11, it can be seen that relevant attributes in the entity 790 can be mapped to corresponding properties of the database table 1210 (e.g., attribute "Lifecycle Status" is mapped to property "LIFECYCLESTATUS"), but the properties of the database table can be less semantically meaningful (e.g., due to capitalization of letters and elimination of spaces between words). In addition, some properties of the database table 1210 can have no matching attributes in the entity 790 (e.g., property "BusinessValidFrom" and "BusinessValidTo" have no matching attributes). Such properties can be related to technical implementations of the database tables and do not need to be represented in the corresponding entity of the data model.

FIG. 13 shows another example database interface 1300 displaying a database table 1310 represented by the Business Partner Contract Assignment entity 780 depicted in FIG. 11. Similarly, the database table 1310, which has two rows or records ("ROLE"="CounterParty" and "ROLE"="SalesAgent"), can be retrieved after running a SELECT statement 1320. Note that while the primary key attribute "Role" of the entity 780 is mapped to a corresponding property "ROLE" of the database table 1310, three foreign keys in the database table 1310, i.e., "ASSOC_FinancialContract.FINANCIALCONTRACTID," "ASSOC_FinancialContract.IDSYSTEM," and "ASSOC_PartnerInParticipation.BUSINESSPARTNERID" have no matching attributes in the entity 780. Also note that the first two foreign keys are respectively linked to the primary keys (i.e., "FINANCIALCONTRACTID" and "IDSYSTEM") of the database table 1210, which respectively correspond to the primary key attributes (i.e., "Financial Contract ID" and "ID System") of the entity 790. The third foreign key is linked to a primary key of another database table represented by the Business Partner entity 710.

FIG. 14 shows an example message 1400 created based on a message structure translated from the logical entity LE3 830 depicted in FIG. 11. As shown, the message 1400 includes data fields organized in JSON format. For example, the data fields include a plurality of property and value pairs, each pair being separated by a colon. The underlying message structure is represented by the properties (shown in bold font) included in the message 1400 (i.e., by stripping all values to the right of the colons). Data fields contained in the message 1400 are obtained from the database tables 1210 and 1310, respectively. For example, the properties can be the same column names in the respective database tables, and the values can be extracted from rows of the respective database tables.

Some data fields 1410 correspond to the attributes of the entity 790, which is annotated as a root 832 of the logical entity LE3 830 (see, e.g., FIG. 11). These data fields 1410 are translated into scalars represented by property and value pairs contained in the database table 1210. For example, the property "FINANCIALCONTRACTID" has a value "My Contract 1" and the property "IDSYSTEM" has a value "1," etc. Some data fields 1420, which correspond to one-to-many cardinality relationship with the entity 780, are translated into an object array "BusinessPartnerContractAssignment," which includes two nested objects 1422, 1424 enclosed between a pair of square brackets, which respectively correspond to the two rows shown in the database table 1310. Each object (1422 or 1424) includes a set of scalars comprising property and value pairs corresponding to a row of the database table 1310. For example, the first object in the array includes the property "ROLE" with the value "CounterParty" contained in the first row, and the second object in the array includes the property "ROLE" with the value "SalesAgent" contained in the second row.

In the depicted example, the database table 1210 has only one row, i.e., the row 1 with "FINANCIALCONTRACTID"="My Contract 1." Assume the database table 1210 has another row, e.g., a row 2 with "FINANCIALCONTRACTID"="My Contract 2." In that case, a new message that is different from message 1400 can be generated for the row 2. The new message for the row 2 will share the same message structure as the message 1400, i.e., all properties listed in the data fields 1410 as well as the object array structure represented by the data fields 1420 are also included in the new message for the row 2. The only difference between the message 1400 (for the row 1) and the new message (for the row 2) are the values corresponding to those properties, which are obtained from row 1 and row 2, respectively. In other words, multiple rows (or records) of a database table represented by the root entity (which can be viewed as multiple instances of the root entity) can be translated into multiple independent messages that share the same underlying message structure corresponding to the logical entity containing the root entity.

Note that in the object array "BusinessPartnerContractAssignment," two foreign keys linked to the primary keys of the database table 1310 are excluded, i.e., the properties "ASSOC_FinancialContract.FINANCIALCONTRACTID" and "ASSOC_FinancialContract.IDSYSTEM" are not listed in either object. Such foreign key exclusion is allowed to avoid data redundancy because the same information is already contained in the message 1400 via the primary keys of the database table 1210 (i.e., "FINANCIALCONTRACTID" and "IDSYSTEM").

Also note that in the object array "BusinessPartnerContractAssignment," a foreign key linked to a database table represented by an entity outside the logical entity LE3 830 is preserved in the message structure. For example, both objects in the object array contain the foreign key "ASSOC_PartnerInParticipation.BUSINESSPARTNERID" and respective values (i.e., "MyCounterParty" and "MySalesAgent") that identify the corresponding database table records. Such foreign key is preserved as an indirect reference in the message structure, reflecting an entity relationship that crosses boundaries of logical units. In this example, the preserved foreign key corresponds to the indirect reference 1034 which links the Business Partner Contract Assignment entity 780 to the Business Partner entity 710, as shown in FIG. 10.

Example 12—Example Method of Generating API Documents

In certain embodiments, for each logical unit annotated by a user, a fully documented external API with executable scripts can be automatically generated (e.g., by the API document generator 244) at least partially based on the message structure translated from the logical unit. In other words, after the user completes a valid annotation of the data model, all entity and attribute descriptions related to the user-annotated logical units can be directly transferred into corresponding API documents in an automated manner.

In certain embodiments, API documents can be generated in a pass-through manner in a programming language such as Swagger (which is an interface description language for describing RESTful APIs expressed using JSON) or HTML. For each logical unit, the automatically generated corresponding API document can include parameter definitions, which can specify parameter name, data type, and other attributes such as descriptions and/or example values. Such parameter definitions can be transferred directly from the message structure (or test message) corresponding to the logical unit.

FIG. 15 shows a portion of an example API document 1500 automatically generated using Swagger based on the message structure depicted in FIG. 14. Note that in the "properties" field, parameters names (e.g., "FINANCIALCONTRACTID," "IDSYSTEM," etc.) are directly transferred from the message structure underlying the message 1400. All data types and descriptions can also be transferred automatically from the data model into the API document. For example, the paragraph for "description" of "schema" (i.e., "Represents a set of legally binding agreements . . . not agreed explicitly.") is directly copied from entity properties of the Financial Contract entity 790 predefined in the conceptual data model 700. Also note that in the depicted example, a POST request is sent using the message structure (as a template) to define the query parameters. Other or additional read options are also possible. For example, the API document can be generated with various GET requests with different parameters (e.g., using a scalar parameter such as an identifier in a GET request, instead of using the message structure as a template).

Automatic generation of API documents for data models can be very helpful for software/database developers because they can be created effortlessly (e.g., with a single click of a button) and then immediately shared within software integration projects. In addition, the automatically generated API documents can have unit test capabilities (e.g., by using the Swagger tools). In other words, the API documents can have executable scripts that can be directly tested to evaluate the data model and underlying database tables.

Example 13—Example Method of Generating Translation Adapters

Figure 16:
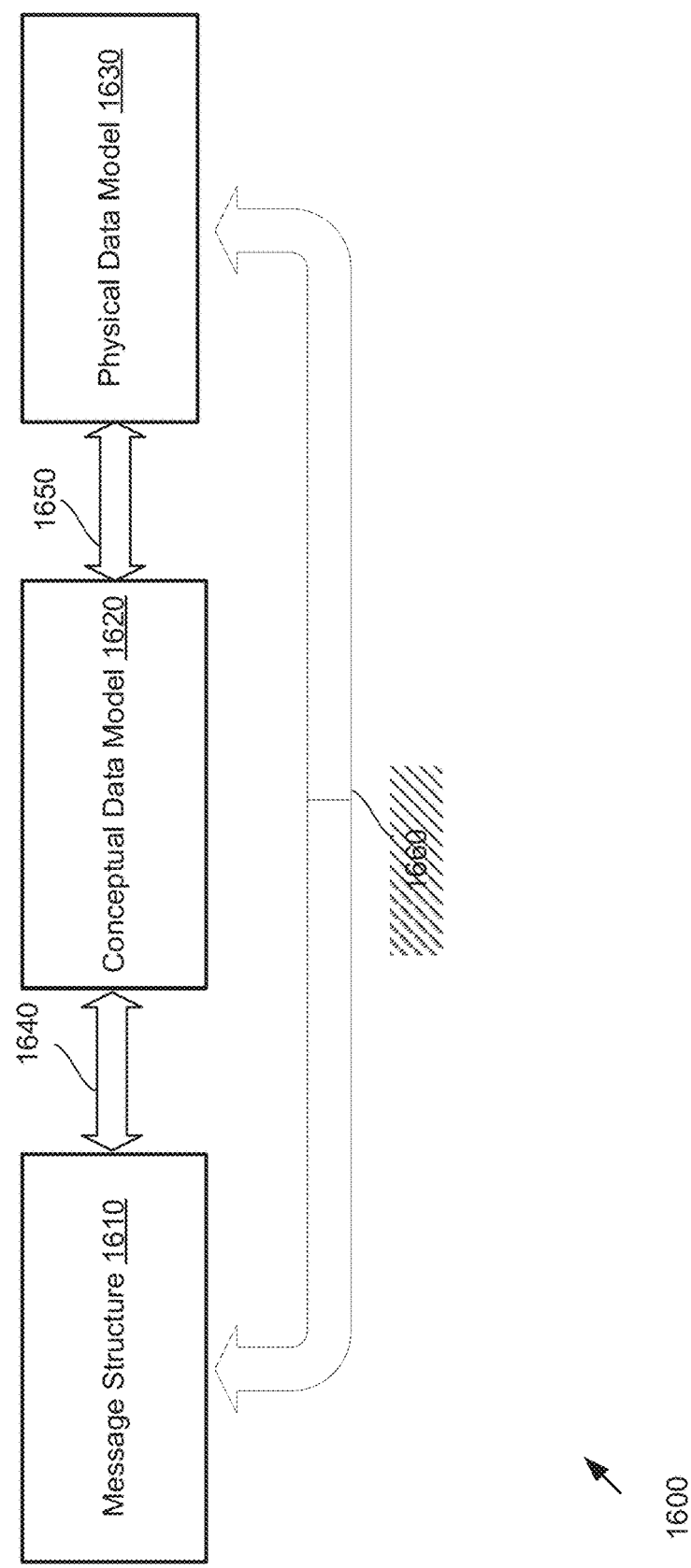
FIG. 16 is a block diagram illustrating an example method of bidirectional mapping between message structures and a physical data model through the transitivity of a conceptual data model.

FIG. 16 is a block diagram 1600 illustrating an example method of bidirectional mapping between message structures 1610 and a physical data model (PDM) 1630 through the transitivity of a conceptual data model (CDM) 1620. As described above, through intelligent data model annotation, a bidirectional mapping 1640 can be established between message structures 1610 the CDM 1620, where each message structure 1640 can be automatically transformed from a logical unit annotated by the user. The mapping 1640 is bidirectional because a relevant attribute or relationship in the CDM 1620 can be represented by a corresponding data field (e.g., a scalar or an object array) in the message structure 1610, and vice versa. Also as noted above, bidirectional mapping 1650 between the CDM 1620 and the PDM 1630 can also be established (e.g., by the CDM-PDM mapping unit 238). Thus, through transitivity of CDM 1620, a bidirectional mapping 1660 between message structures 1610 and the PDM 1630 can be established. In addition, because a data model (CDM or PDM) represents related database tables, there is an inferred mapping between the message structure 1610 and database tables represented by the data model.

Two translation operators (e.g., a read adapter and a write adapter) are described herein as examples to illustrate the bidirectional mapping between message structures 1610 and the PDM 1630. As described herein, the translation operators can be generated by the code generator 246, which accepts an annotated CDM c, a PDM p as well as the mapping m defined between c and p. The code generator 246 can generate two code artefacts: a read adapter r for message read operations and a write adapter w for message write operations. Both r and w adapters follow the format and template defined by the message structures.

The signature of the read adapter can be expressed as r(t)→m. Specifically, the read adapter r is configured to receive a message template t and convert it into a completed message m if matching record(s) described by the message template t could be found in related database tables. Otherwise, the read adapter r returns a null or empty message.

According to one example operational procedure, the read adapter r can be configured to generate an SQL retrieval statement (e.g., SELECT) given an inferred mapping between the message structure of the message template t and database tables (represented by the logical unit corresponding to the message structure). For example, the data model may have a "Loan" entity, but the underlying database tables may not have a "Loan" table. Instead, the data related to the loans may be stored in a database table named "Contract." Despite the mismatch of names, through inferred mapping, the "Loan" entity in the data model can be linked to the "Contract" database table, and a corresponding SQL retrieval statement, e.g., "SELECT . . . FROM Contract" can be generated. According to one example embodiment, the read adapter r can be configured to traverse a path from the root to the relevant entity (e.g., through annotated follow relationships), and the SQL statement can be generated to implement the path. The read adapter r can then parse the message template t, and execute the SQL retrieval statement based on the message template t (e.g., finding records containing values that match identifying properties specified in the message template t, as described below). The read adapter r can then convert the query results into the message m given the inferred mapping and return the message m.

As described herein, the message template t can be an almost "empty" message having a message structure (transformed from a logical unit of a data model), where only one or more "identifying" properties have pairing values while all other properties in the template t have no pairing values. Any property in the template t can be an identifying property. The return message m, if found, is the same as the message template t except that it contains pairing values for all properties, where the pairing values are retrieved from the matching record(s). In certain embodiments, the message template t can be a subset of a message structure, i.e., the properties included in the message template t are only a selected subset of all properties included in the message structure.

As examples, a message template t can be created using the message structure underlying the message 1400 shown in FIG. 14. In one example, the message template t can include all properties contained in the message structure, and the only "identifying" property is "FINANCIALCONTRACTID" which has a pairing value "My Contract 1" (i.e., all other properties are empty, i.e., have no pairing values). Using such message template t as an input, running the read adapter r will return a message m corresponding to a matching record whose property "FINANCIALCONTRACTID" has the value "My Contract 1." In this example, that matching record will be the single row of the database table 1210 depicted in FIG. 12. Thus, the returned message m will contain pairing values for all properties, where the pairing values are retrieved from the matching record. In other words, the returned message m will be the same as message 1400.

In yet another example, the message template t can include only the following four selected properties contained in the message structure: "BusinessValidFrom," "BusinessValidTo," "Description," and "LIFECYCLESTATUS." Assuming "LIFECYCLESTATUS" is the only identifying property with a pairing value "ActiveContract" and all other three properties in the message template t have no pairing values, then running the read adapter r with such a message template t will return a message m corresponding to a matching record whose property "LIFECYCLESTATUS" has the value "ActiveContract." In this example, the matching record is also the single row of the database table 1210 depicted in FIG. 12, but the returned message m will only contain pairing values (retrieved from the matching record) for other three properties specified in the message template t.

As described above, the database table 1210 can have multiple rows. For example, the property "FINANCIALCONTRACTID" in different rows of the database table 1210 can be "My Contract 1," "My Contract 2," . . . , "My Contract m," etc. In such circumstances, running the read adapter r may find multiple matching records, e.g., multiple rows of the database table 1210 can have the value "ActiveContract" corresponding to the property "LIFECYCLESTATUS." In that case, the returned message m will be a message array, where each message in the array corresponds to one of the matching records.

In the examples described above, only one property in the message template t is the identifying property. In other examples, a message template t can have more than one identifying properties. In such scenarios, the read adapter r can be configured to determine a matching record if the record matches all identifying properties (i.e., requiring a logical AND of all identifying properties). Alternatively, the read adapter r can be configured to determine a matching record if the record matches any one of the identifying properties (i.e., requiring a logical OR of all identifying properties). For example, such scenarios can generate SQL WHERE statement with AND and OR conditions, respectively. Other Boolean relationship of identifying properties can be specified for determining matching records, and such Boolean relationship can be an optional input parameter to the read adapter r.

The signature of the write adapter can be expressed as w(m). Specifically, the write adapter w receives a message m, and optionally can return a write status (e.g., success or error). The message m has a message structure transformed from a logical unit of a data model and contains one or more property and value pairs. Running of the write adapter w can thus write the values contained in the message m to corresponding properties of the database tables represented by the logical unit of the data model.

According to one example operational procedure, the write adapter w can be configured to generate an SQL insert statement (e.g., INSERT) given an inferred mapping between the message structure of the message m and database tables (represented by the logical unit corresponding to the message structure). The write adapter w can then parse the message m, and execute the SQL insert statement based on the message m. As a result, the pairing values contained in the message m can be written into records of the database tables having the corresponding properties. Optionally, the write status can be returned.

In certain examples, for both the read adapter r and the write adapter w, some of the operational steps described above can be achieved using default libraries, such as Jackson can be used for JSON parsing and Java Persistence API (JPA) can be used for object relational mapping (ORM).

In certain examples, to improve the performance, the read adapter r and/or the write adapter w may not generate queries on demand, but rather construct views of related database tables beforehand.

It is to be understood that the above described operational procedures of the read adapter r and the write adapter w are database or storage solution independent, whereas the generated database artefacts (i.e., the read adapter r and the write adapter w) are not.

Example 14—Example User Interfaces for Data Model Annotation

For illustration purposes, FIGS. 17-20 show a graphic user interface 1700 (which can be one particular example and/or portion of the user interface 232) which can be used by a user to annotate a data model.

As shown, the graphic user interface 1700 can include a computing device 1710 (e.g., a tablet computer, or a smart phone, or a desktop computer, etc.) having a display window 1720, which can have a touch sensitive screen. A data model 1730 can be graphically displayed in the display window 1720. The user can use a touch input device 1740 (e.g., a stylus, a mouse, a finger, or the like) to point to anywhere in the display window 1720 and enter various user input.

Figure 17:
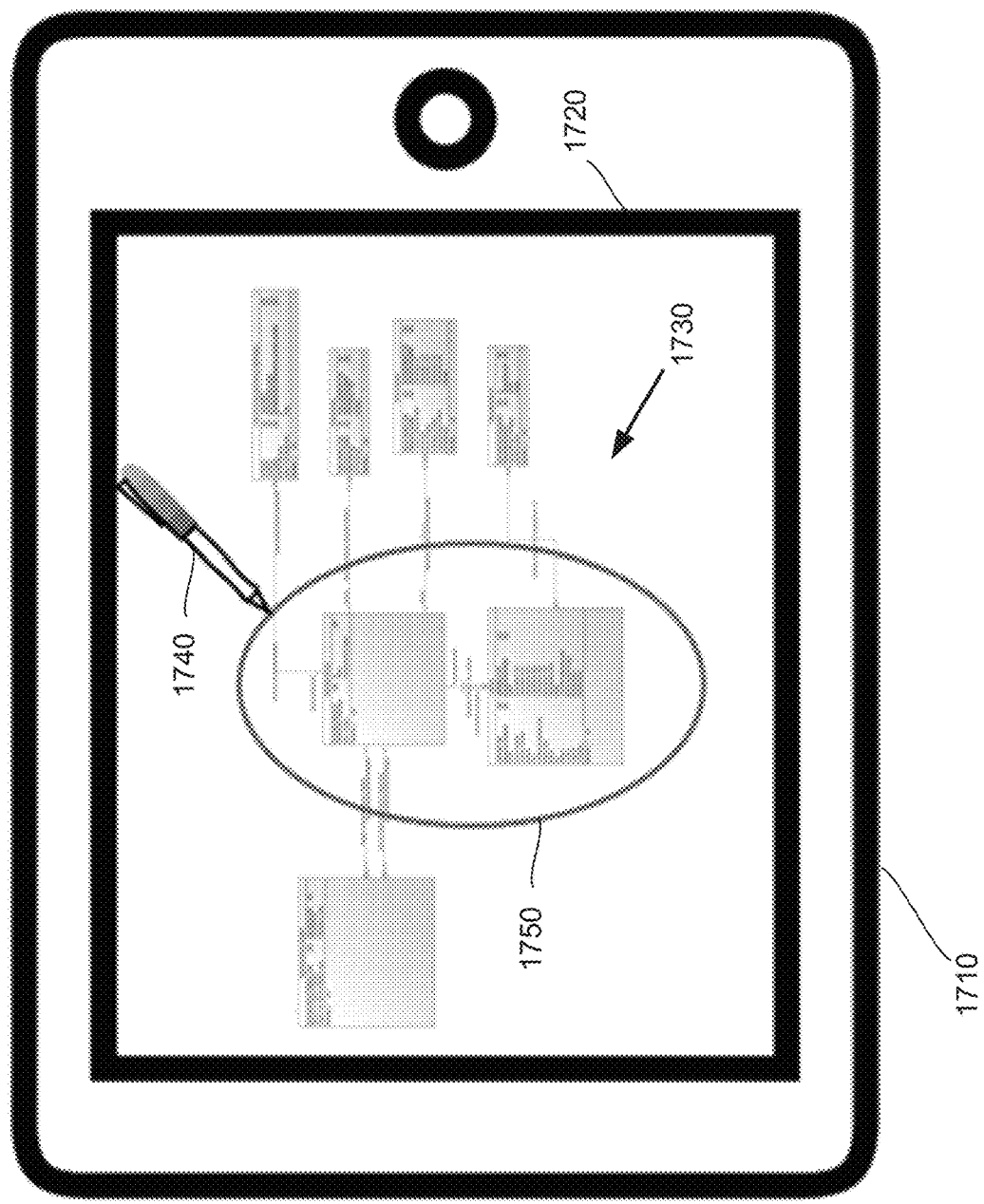
FIG. 17 is an example graphical user interface illustrating selection of a logical entity in an entity-relationship data model.

For example, FIG. 17 shows that the user can use the input device 1740 to define a logical unit 1750 (which can be an LE or an LR) by drawing a boundary (e.g., in a lasso style manner) enclosing selected entities of the data model 1730. The user can erase a previous logical unit selection and redraw the boundary if needed. Other similar methods can be used to select entities included in the logical unit 1750. For example, the user can select entities of the logical unit 1750 by clicking target entities using a mouse while simultaneously pressing a certain key (e.g., ctrl) on the keyboard, or the like.

Figure 18:
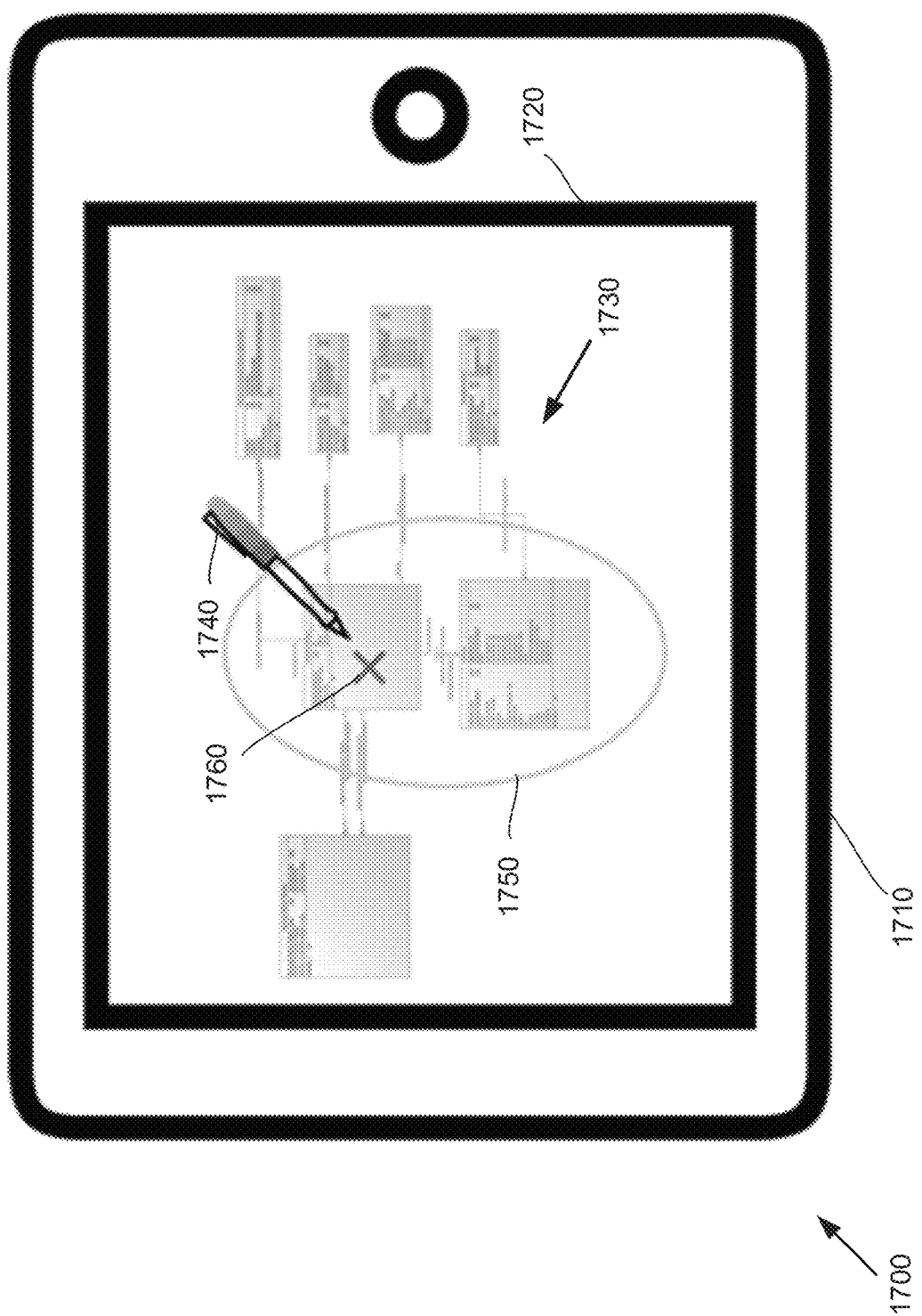
FIG. 18 is an example graphical user interface showing annotation of a root for the selected logical entity depicted in FIG. 17.

In another example, FIG. 18 shows that the user can designate a root entity within the selected logical unit 1750, for example, by drawing a predefined marker 1760 (e.g., a cross). The user can erase a previously drawn marker 1760 and redefine the root entity if needed. Other methods can be similarly used to select the root entity (e.g., by double clicking a mouse button, or selecting through a context menu, or through a long press exceeding a predefined duration, or the like).

Figure 19:
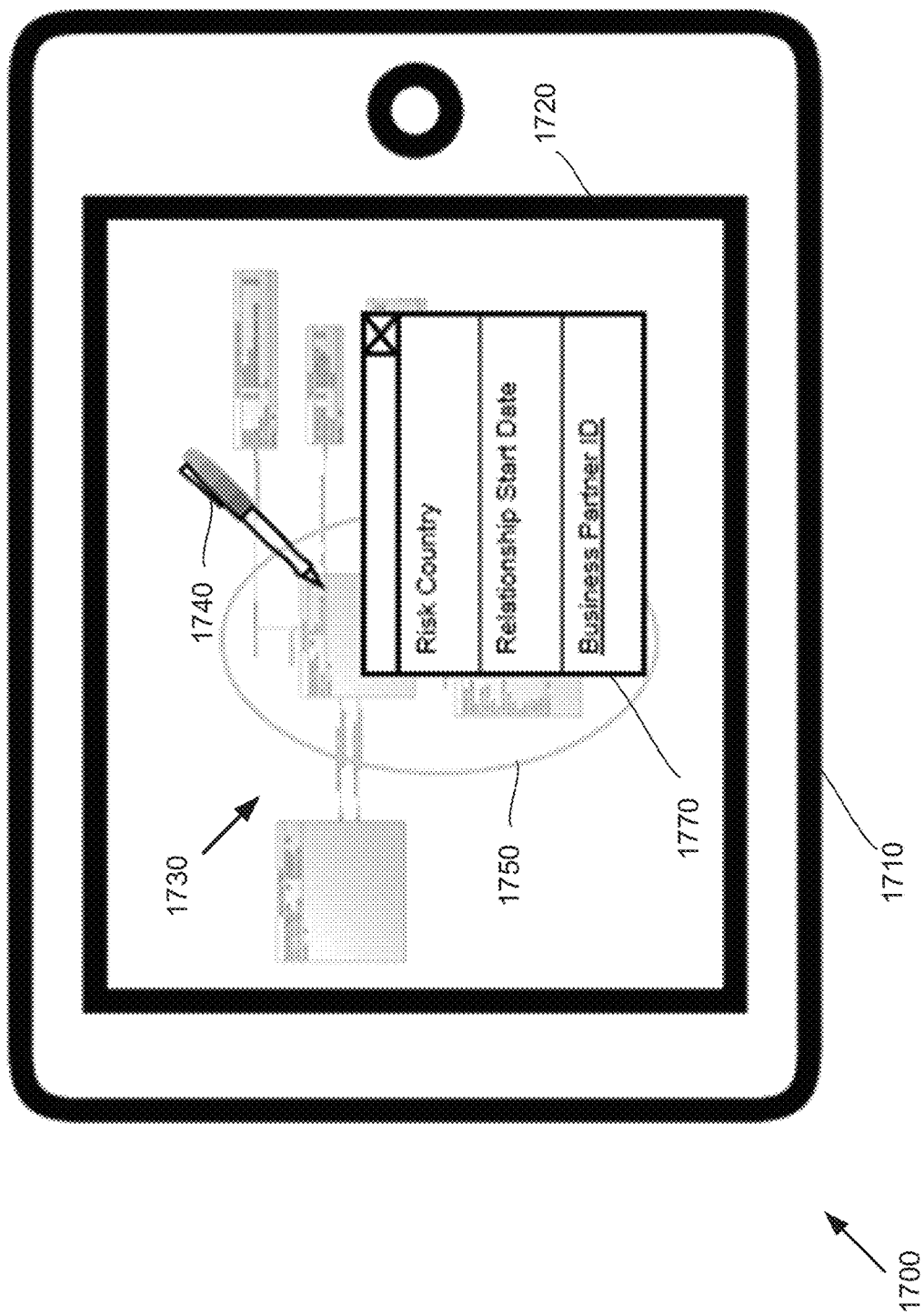
FIG. 19 is an example graphical user interface showing a list of attributes for a selected entity in the selected logical entity depicted in FIG. 17.

In yet another example, FIG. 19 shows that the user can view attributes of a selected entity through a popup window 1770. In the depicted example, three attributes "Risk Country," "Relationship Start Date," and "Business Partner ID" (which is a primary key field indicated by the underline) are shown. This can be achieved in a number of ways, e.g., by a long press of the entity exceeding a predefined duration, by right click a mouse button, by selecting a menu item, or the like. In some examples, when the attributes cannot be fit within the popup window 1770, a scroll bar can be provided so that the user can browse through all attributes of the entity.

Figure 20:
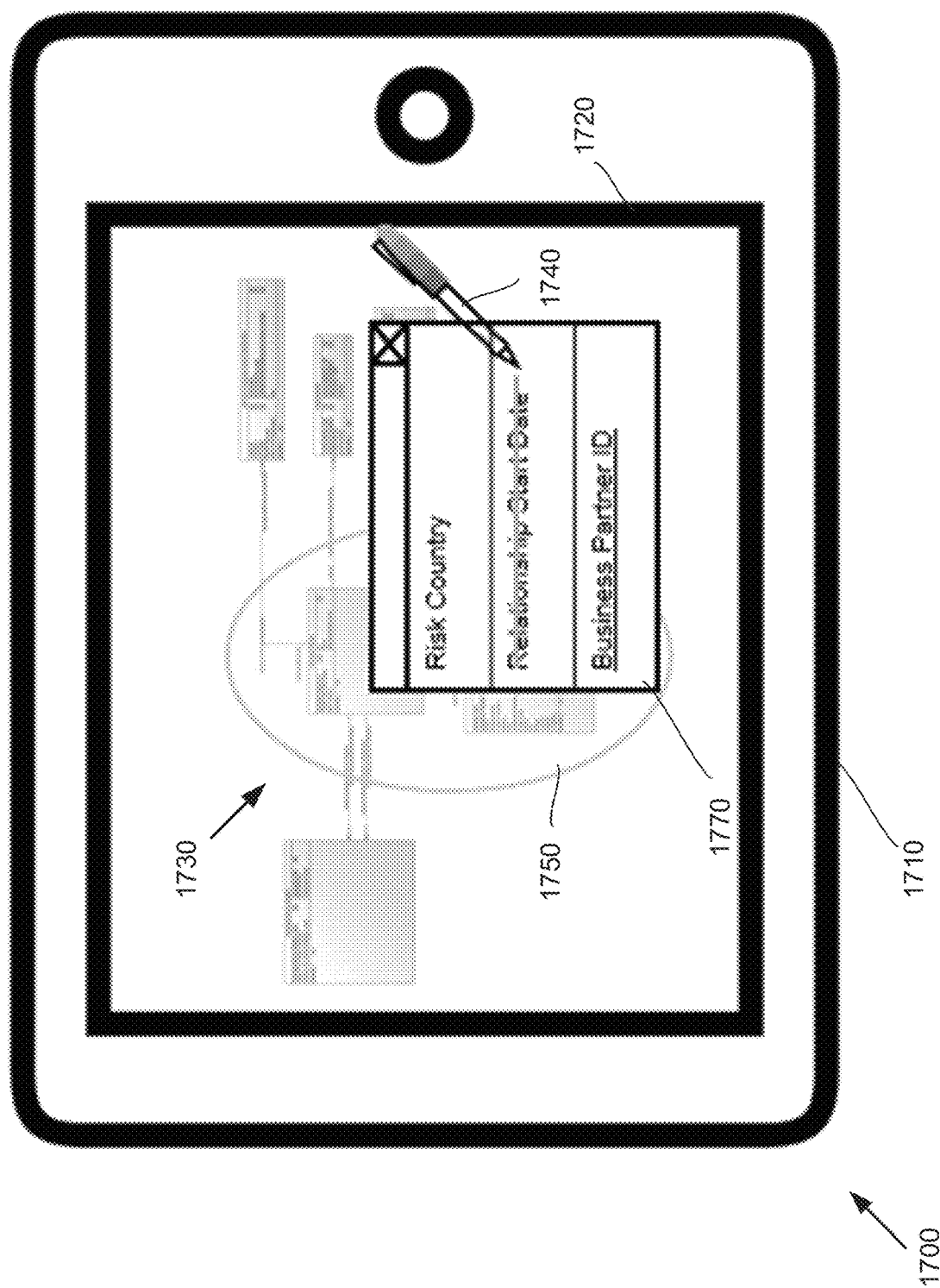
FIG. 20 is an example graphical user interface showing selection of attributes for the selected entity depicted in FIG. 19.

In yet a further example, FIG. 20 shows that the user can exclude certain attributes from being translated into a corresponding message structure. In the depicted example, the user can use the input device 1740 to cross out an attribute (e.g., "Relationship Start Date"), annotating such attribute as irrelevant. Such irrelevant attribute will not be translated into the message structure. Alternatively, the user can use the input device 1740 to select which attributes are relevant, and thus will be translated into the message structure (e.g., by placing check or tick mark symbols next to the selected attributes). Other similar methods for inclusion and/or exclusion of selected attributes of an entity can be used.

After the user finishes annotations of the data model (e.g., selection of logical units, root entities, and optionally relevancy/irrelevancy of attributes), the user's annotation can be automatically validated as described above. Additional actions (e.g., generation of message structures, test messages, API documents, and translation operators) can also be automatically executed after passing the validation, as described above.

Example 15—Example Advantages

A number of advantages can be achieved via the technology described herein. For example, the disclosed technology can translate between a data model (which can be a CDM or a PDM) and a message structure through intelligent annotation of the data model. Such technology can help users to design error-free message structures at the design time of the data model, thus interoperability with the physical database (e.g., the database tables represented by the data model) can be ensured. The disclosed technology can automatically check the human-made designs and detect errors such as loops within logical entities (e.g., based on the DIAG criterion) that would lead to message incompatibility, thus avoiding errors and ensuring a working data model. The disclosed technology can generate a test message using predefined sample data so that the user can confirm the translated message structure is satisfactory. In addition, the disclosed technology can automatically generate API documents for immediate usage (e.g., unit testing and/or system integration) when accessing the system through an external environment. Moreover, the disclosed technology can automatically generate translation operators (e.g., the read and write adapters) that can be directly used or adapted for message writing to and/or retrieval from the database. Importantly, the above features are advantageously independent of the data storage solution.

Example 16—Example Computing Systems

Figure 21:
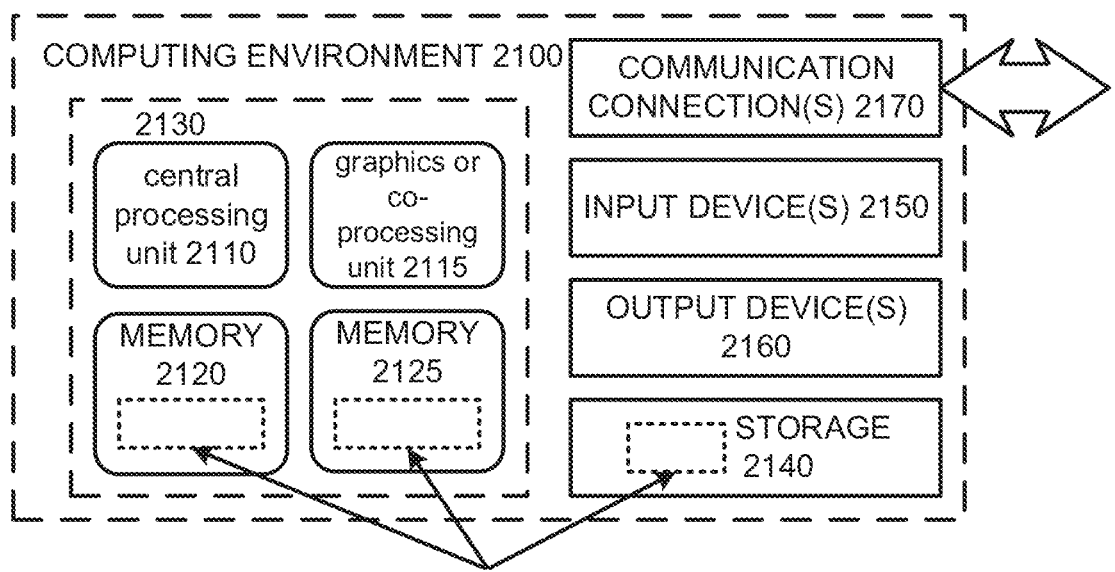
FIG. 21 is a block diagram of an example computing system in which described embodiments can be implemented.

FIG. 21 depicts an example of a suitable computing system 2100 in which the described innovations can be implemented. The computing system 2100 is not intended to suggest any limitation as to scope of use or functionality of the present disclosure, as the innovations can be implemented in diverse computing systems.

With reference to FIG. 21, the computing system 2100 includes one or more processing units 2110, 2115 and memory 2120, 2125. In FIG. 21, this basic configuration 2130 is included within a dashed line. The processing units 2110, 2115 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 21 shows a central processing unit 2110 as well as a graphics processing unit or co-processing unit 2115. The tangible memory 2120, 2125 can be volatile memory (e.g., registers, cache, RAM), non-volatile memory (e.g., ROM, EEPROM, flash memory, etc.), or some combination of the two, accessible by the processing unit(s) 2110, 2115. The memory 2120, 2125 stores software 2180 implementing one or more innovations described herein, in the form of computer-executable instructions suitable for execution by the processing unit(s) 2110, 2115.

A computing system 2100 can have additional features. For example, the computing system 2100 includes storage 2140, one or more input devices 2150, one or more output devices 2160, and one or more communication connections 2170, including input devices, output devices, and communication connections for interacting with a user. An interconnection mechanism (not shown) such as a bus, controller, or network interconnects the components of the computing system 2100. Typically, operating system software (not shown) provides an operating environment for other software executing in the computing system 2100, and coordinates activities of the components of the computing system 2100.

The tangible storage 2140 can be removable or non-removable, and includes magnetic disks, magnetic tapes or cassettes, CD-ROMs, DVDs, or any other medium which can be used to store information in a non-transitory way and which can be accessed within the computing system 2100. The storage 2140 stores instructions for the software implementing one or more innovations described herein.

The input device(s) 2150 can be an input device such as a keyboard, mouse, pen, or trackball, a voice input device, a scanning device, touch device (e.g., touchpad, display, or the like) or another device that provides input to the computing system 2100. The output device(s) 2160 can be a display, printer, speaker, CD-writer, or another device that provides output from the computing system 2100.

The communication connection(s) 2170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 17—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 18—Example Cloud Computing Environment

Figure 22:
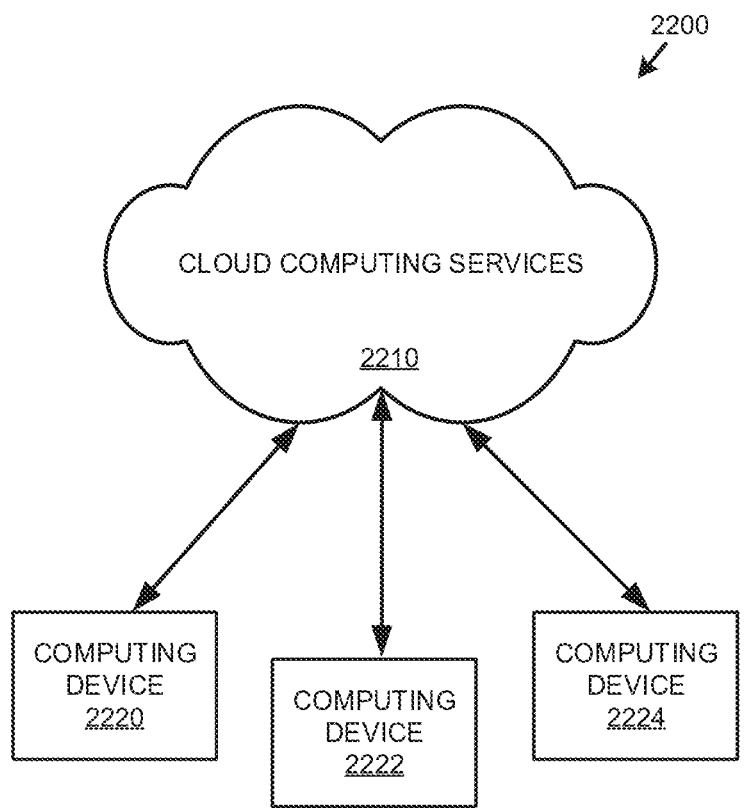
FIG. 22 is a block diagram of an example cloud computing environment that can be used in conjunction with the technologies described herein.

FIG. 22 depicts an example cloud computing environment 2200 in which the described technologies can be implemented, including, e.g., the system disclosed above and other systems herein. The cloud computing environment 2200 comprises cloud computing services 2210. The cloud computing services 2210 can comprise various types of cloud computing resources, such as computer servers, data storage repositories, networking resources, etc. The cloud computing services 2210 can be centrally located (e.g., provided by a data center of a business or organization) or distributed (e.g., provided by various computing resources located at different locations, such as different data centers and/or located in different cities or countries).

The cloud computing services 2210 are utilized by various types of computing devices (e.g., client computing devices), such as computing devices 2220, 2222, and 2223. For example, the computing devices (e.g., 2220, 2222, and 2224) can be computers (e.g., desktop or laptop computers), mobile devices (e.g., tablet computers or smart phones), or other types of computing devices. For example, the computing devices (e.g., 2220, 2222, and 2224) can utilize the cloud computing services 2210 to perform computing operations (e.g., data processing, data storage, and the like).

In practice, cloud-based, on-premises-based, or hybrid scenarios can be supported.

Example 19—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 20—Example Embodiments

Any of the following embodiments can be implemented.

Clause 1. A computer-implemented method comprising: receiving a data model comprising entities and relationships between the entities, wherein an entity comprises a set of attributes; annotating the data model by defining a logical entity comprising one or more of the entities; validating the logical entity; and automatically generating a message structure corresponding to the logical entity, wherein the message structure comprises properties mapped to at least some of the attributes of entities contained in the logical entity, wherein the properties are defined in one or more database tables represented by the logical entity.

Clause 2. The method of clause 1, further comprising generating a message containing the message structure, wherein the message comprises values corresponding to the properties.

Clause 3. The method of any one of clauses 1-2, wherein automatically generating the message structure comprises creating an object array when a first database table and a second database table represented by the logical entity have a one-to-many cardinality relationship or many-to-many cardinality relationship, wherein the object array comprises an array of objects containing properties defined in the second database table.

Clause 4. The method of clause 3, wherein automatically generating the message structure further comprises excluding a property from the object array if the property defined in the second database table is a foreign key linked to a primary key defined in the first database table.

Clause 5. The method of any one of clauses 1-4, further comprising automatically generating an API document at least partially based on the message structure.

Clause 6. The method of any one of clauses 1-5, wherein annotating the data model further comprises selecting which attributes of the entities contained in the logical entity to be mapped to corresponding properties in the message structure.

Clause 7. The method of any one of clauses 1-6, wherein annotating the data model further comprises defining a root within the logical entity, wherein the root is one of the one or more entities contained in the logical entity.

Clause 8. The method of clause 7, wherein annotating the data model further comprises designating one or more of the relationships between entities as follow relationships.

Clause 9. The method of clause 8, wherein validating the logical entity comprises traversing from the root to another entity contained in the logical entity through one or more of the follow relationships.

Clause 10. The method of any one of clauses 8-9, wherein validating the logical entity comprises detecting an invalid logical entity when the one or more entities contained in the logical entity can form a loop through some of the follow relationships.

Clause 11. A system comprising: memory; one or more hardware processors coupled to the memory; and one or more computer readable storage media storing instructions that, when loaded into the memory, cause the one or more hardware processors to perform operations comprising: receiving a data model comprising entities and relationships between the entities, wherein an entity comprises a set of attributes; annotating the data model by defining a logical entity comprising one or more of the entities; validating the logical entity; and automatically generating a message structure corresponding to the logical entity, wherein the message structure comprises properties mapped to at least some of the attributes of entities contained in the logical entity, wherein the properties are defined in one or more database tables represented by the logical entity.

Clause 12. The system of clause 11, wherein the operations further comprise generating a message containing the message structure, wherein the message comprises values corresponding to the properties.

Clause 13. The system of any one of clauses 11-12, wherein automatically generating the message structure comprises creating an object array when a first database table and a second database table represented by the logical entity have a one-to-many cardinality relationship or many-to-many cardinality relationship, wherein the object array comprises an array of objects containing properties defined in the second database table.

Clause 14. The system of clause 13, wherein automatically generating the message structure further comprises excluding a property from the object array if the property defined in the second database table is a foreign key linked to a primary key defined in the first database table.

Clause 15. The system of any one of clauses 11-14, wherein the operations further comprise automatically generating an API document at least partially based on the message structure.

Clause 16. The system of any one of clauses 11-15, wherein annotating the data model further comprises selecting which attributes of the entities contained in the logical entity to be mapped to corresponding properties in the message structure.

Clause 17. The system of any one of clauses 11-16, wherein annotating the data model further comprises defining a root within the logical entity, wherein the root is one of the one or more entities contained in the logical entity.

Clause 18. The system of clause 17, wherein annotating the data model further comprises designating one or more of the relationships between entities as follow relationships.

Clause 19. The system of clause 18, wherein validating the logical entity comprises detecting an invalid logical entity when the one or more entities contained in the logical entity can form a loop through some of the follow relationships.

Clause 20. A computer-implemented method for data model annotation, the method comprising: receiving a data model comprising entities and relationships between the entities, wherein an entity comprises a set of attributes; annotating the data model by defining a logical entity comprising one or more of the entities; validating the logical entity; automatically generating a message structure corresponding to the logical entity, wherein the message structure comprises properties mapped to at least some of the attributes of entities contained in the logical entity, wherein the properties are defined in one or more database tables represented by the logical entity; and automatically generating a read adapter and a write adapter; wherein the read adapter is configured to convert a message template containing the message structure into a completed message, wherein one or more properties in the message template are empty but have corresponding values retrieved from a matching record in the one or more database tables; wherein the write adapter is configured to receive an input message containing the message structure and comprising at least one property and value pair, and write the value corresponding to the property into the one or more database tables.

Example 21—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising:
receiving an entity-relationship data model representing a data schema in a graphical form, the entity-relationship model comprising entities and relationships between the entities, wherein an entity comprises a set of attributes;
annotating the entity-relationship data model, wherein the annotating comprises grouping a plurality of entities into a logical entity;
validating the logical entity;
responsive to finding the logical entity is valid, automatically generating a message structure corresponding to the logical entity, wherein the message structure is represented in a data exchange format expressed in property and value pairs, wherein the message structure comprises properties mapped to at least some of the attributes of entities contained in the logical entity, wherein the properties are defined in one or more database tables represented by the logical entity;
generating a message containing the message structure, wherein generating the message comprises extracting values from the one or more database tables, and pairing the extracted values with corresponding properties; and
generating a translation operator code,
wherein the translation operator code is configured to translate messages between the logical entity and the one or more database tables based on the message structure,
wherein automatically generating the message structure comprises creating an object array when a first database table and a second database table represented by the logical entity have a one-to-many cardinality relationship or many-to-many cardinality relationship, wherein the object array comprises an array of objects containing properties defined in the second database table, wherein the array of objects are nested within another object representing a property defined in the first database table.

2. The method of claim 1, wherein automatically generating the message structure further comprises excluding a property from the object array if the property defined in the second database table is a foreign key linked to a primary key defined in the first database table.

3. The method of claim 1, further comprising automatically generating an application programming interface document at least partially based on the message structure.

4. The method of claim 1, wherein annotating the entity-relationship data model further comprises selecting which attributes of the entities contained in the logical entity to be mapped to corresponding properties in the message structure.

5. The method of claim 1, wherein annotating the entity-relationship data model further comprises defining a root within the logical entity, wherein the root is one of the one or more entities contained in the logical entity.

6. The method of claim 5, wherein annotating the entity-relationship data model further comprises designating one or more of the relationships between entities as follow relationships.

7. The method of claim 6, wherein validating the logical entity comprises traversing from the root to another entity contained in the logical entity through one or more of the follow relationships.

8. The method of claim 6, wherein validating the logical entity comprises detecting an invalid logical entity when the plurality of entities contained in the logical entity can form a loop through some of the follow relationships.

9. A system comprising:
memory;
one or more hardware processors coupled to the memory; and
one or more computer readable storage media storing instructions that, when loaded into the memory, cause the one or more hardware processors to perform operations comprising:
receiving an entity-relationship data model representing a data schema in a graphical form, the entity-relationship model comprising entities and relationships between the entities, wherein an entity comprises a set of attributes;
annotating the entity-relationship data model, wherein the annotating comprises grouping a plurality of entities into a logical entity;
validating the logical entity;
responsive to finding the logical entity is valid, automatically generating a message structure corresponding to the logical entity, wherein the message structure is represented in a data exchange format expressed in property and value pairs, wherein the message structure comprises properties mapped to at least some of the attributes of entities contained in the logical entity, wherein the properties are defined in one or more database tables represented by the logical entity;
generating a message containing the message structure, wherein generating the message comprises extracting values from the one or more database tables, and pairing the extracted values with corresponding properties; and
generating a translation operator code,
wherein the translation operator code is configured to translate messages between the logical entity and the one or more database tables based on the message structure,
wherein automatically generating the message structure comprises creating an object array when a first database table and a second database table represented by the logical entity have a one-to-many cardinality relationship or many-to-many cardinality relationship, wherein the object array comprises an array of objects containing properties defined in the second database table, wherein the array of objects are nested within another object representing a property defined in the first database table.

10. The system of claim 9, wherein automatically generating the message structure further comprises excluding a property from the object array if the property defined in the second database table is a foreign key linked to a primary key defined in the first database table.

11. The system of claim 9, wherein the operations further comprise automatically generating an application programming interface document at least partially based on the message structure.

12. The system of claim 9, wherein annotating the entity-relationship data model further comprises selecting which attributes of the entities contained in the logical entity to be mapped to corresponding properties in the message structure.

13. The system of claim 9, wherein annotating the entity-relationship data model further comprises defining a root within the logical entity, wherein the root is one of the plurality of entities contained in the logical entity.

14. The system of claim 13, wherein annotating the entity-relationship data model further comprises designating one or more of the relationships between entities as follow relationships.

15. The system of claim 14, wherein validating the logical entity comprises detecting an invalid logical entity when the one or more entities contained in the logical entity can form a loop through some of the follow relationships.

16. A computer-implemented method for data model annotation, the method comprising:
- receiving an entity-relationship data model representing a data schema in a graphical form, the entity-relationship model comprising entities and relationships between the entities, wherein an entity comprises a set of attributes;
- annotating the entity-relationship data model, wherein the annotating comprises grouping a plurality of entities into a logical entity;
- validating the logical entity;
- responsive to finding the logical entity is valid, automatically generating a message structure corresponding to the logical entity, wherein the message structure is represented in a data exchange format expressed in property and value pairs, wherein the message structure comprises properties mapped to at least some of the attributes of entities contained in the logical entity, wherein the properties are defined in one or more database tables represented by the logical entity;
- generating a message containing the message structure, wherein generating the message comprises extracting values from the one or more database tables, and pairing the extracted values with corresponding properties; and
- automatically generating a read adapter and a write adapter;
- wherein the read adapter is configured to convert a message template containing the message structure into a completed message, wherein one or more properties in the message template are empty but have corresponding values retrieved from a matching record in the one or more database tables;
- wherein the write adapter is configured to receive an input message containing the message structure and comprising at least one property and value pair, and write the value corresponding to the property into the one or more database tables,
- wherein automatically generating the message structure comprises creating an object array when a first database table and a second database table represented by the logical entity have a one-to-many cardinality relationship or many-to-many cardinality relationship, wherein the object array comprises an array of objects containing properties defined in the second database table, wherein the array of objects are nested within another object representing a property defined in the first database table.

* * * * *